United States Patent [19]

Fieres et al.

[11] Patent Number: 5,841,870
[45] Date of Patent: Nov. 24, 1998

[54] DYNAMIC CLASSES OF SERVICE FOR AN INTERNATIONAL CRYPTOGRAPHY FRAMEWORK

[75] Inventors: Helmut Fieres, Mountain View; Roger Merckling; Keith Klemba, both of Palo Alto, all of Calif.

[73] Assignee: Cheyenne Property Trust, San Francisco, Calif.

[21] Appl. No.: 748,085

[22] Filed: Nov. 12, 1996

[51] Int. Cl.[6] ....................................................... H04L 9/00
[52] U.S. Cl. ................................... 380/25; 380/49; 380/4
[58] Field of Search ................................. 380/23, 25, 52, 380/4, 49

[56] References Cited

U.S. PATENT DOCUMENTS 5,651,068   7/1997   Klemba et al. ............................. 380/25

*Primary Examiner*—David Cain

[57] ABSTRACT

An international cryptography framework (ICF) allows manufacturers to comply with varying national laws governing the distribution of cryptographic capabilities. The invention is concerned primarily with the application certification aspects of the framework where an application that requests cryptographic services from the ICF service elements is identified through some form of certificate to protect against the misuse of a granted level of cryptography. The levels of cryptography granted are described via security policies and expressed as classes of service. A cryptographic unit, one of the ICF core elements, can be used to build several certification schemes for application objects. The invention provides various methods that determine the strength of binding between an application code image and the issued certificates within the context of the ICF elements. A key element with regard to the exercise of a cryptographic function concerns the special requirements for the trust relation that an authority specifies for the cryptographic unit. Any function exercised by the cryptographic unit must be controllable by the associated class of service which represents the security policy. Touchpointing, both in the application and the firmware elements inside the cryptographic unit, plays a key role in exercising control over the functioning of these modules. Another fundamental requirement of the ICF architecture is that the application is assured of the integrity of the cryptographic unit from which it is receiving services. Thus, the invention also provides methods that allow a determination of whether or not the cryptographic unit has been replaced or tampered with.

60 Claims, 13 Drawing Sheets

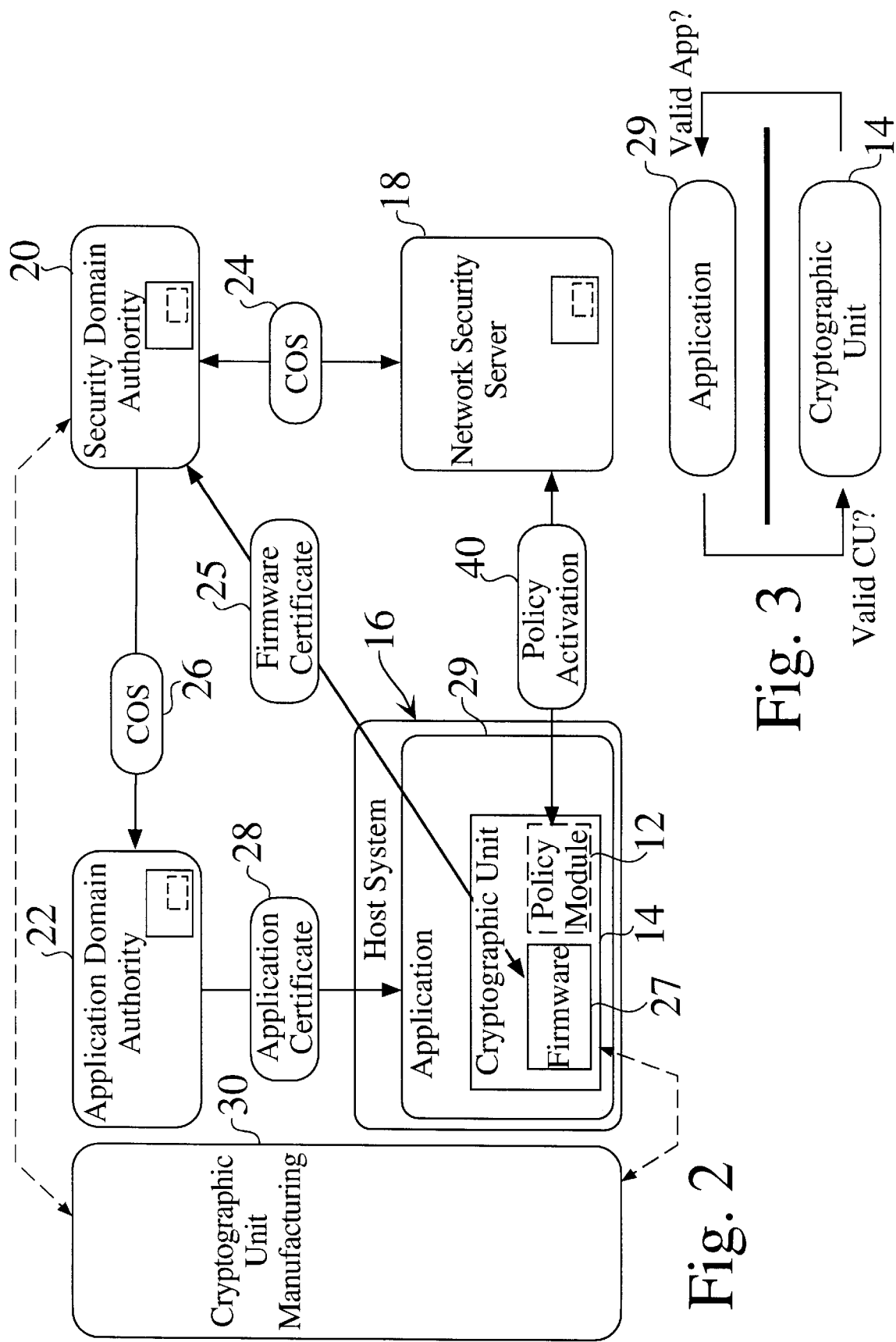

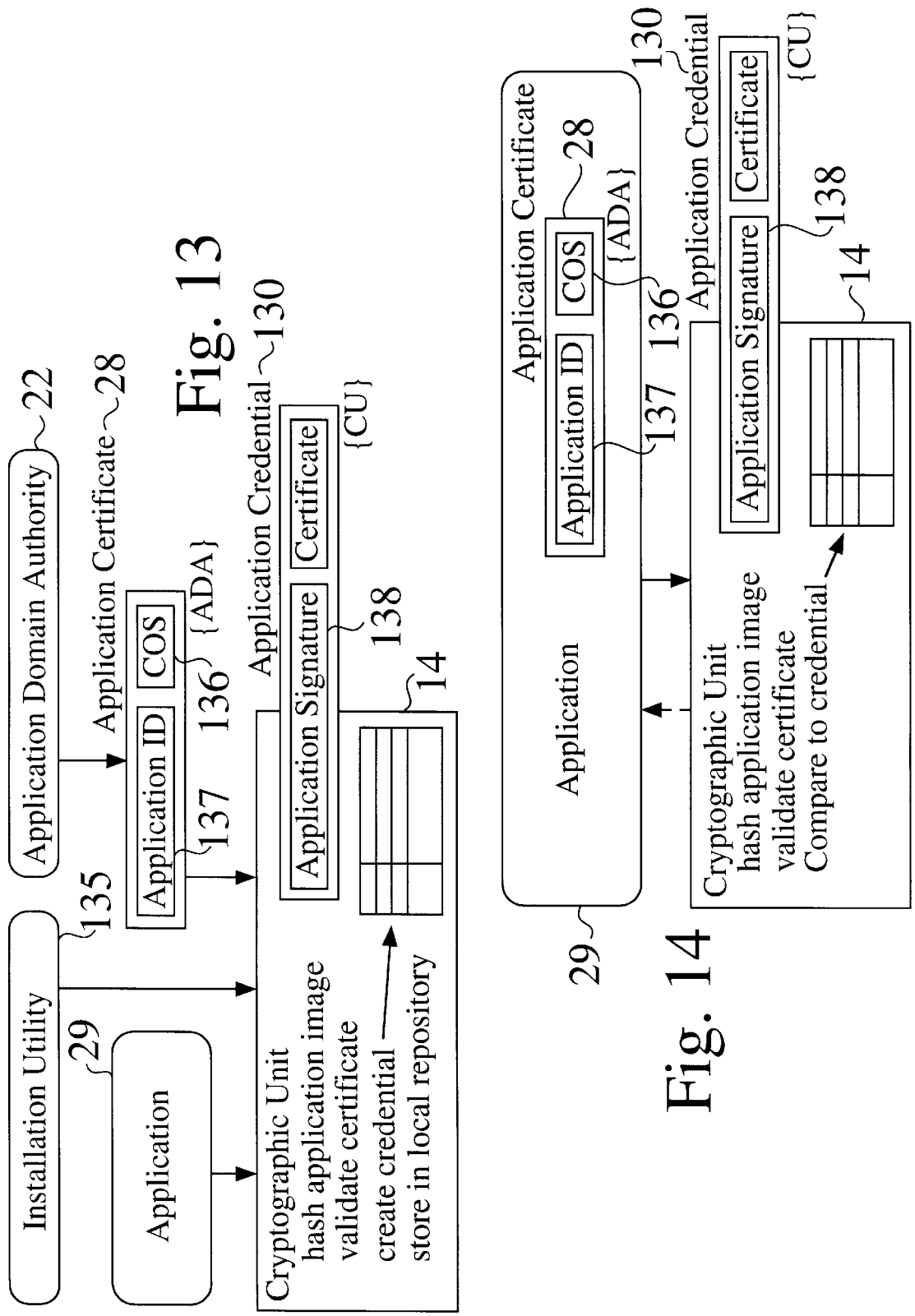

DYNAMIC CLASSES OF SERVICE FOR AN INTERNATIONAL CRYPTOGRAPHY FRAMEWORK

BACKGROUND OF THE INVENTION

1. Technical Field

The invention relates to cryptography. More particularly, the invention relates to dynamic classes of service for use with an international cryptography framework.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies; alone can not resolve the national policy differences. Consequently, it would be useful to provide a common, accepted cryptography framework, wherein independent technology and policy choices can be made in a way that still enables international cryptographic communications consistent with these policies.

A four-part technology framework that supports international cryptography, which includes a national flag card, a cryptographic unit, a host system, and a network security server is disclosed by K. Klemba, R. Merckling, *International Cryptography Framework*, in a copending U.S. patent application Ser. No. 08/401,588, which was filed on 8 Mar. 1995. Three of these four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The international cryptography framework (ICF) supports the design, implementation, and operational elements of any and all national policies, while unifying the design, development, and operation of independent national security policies. The framework thus gives standard form to tie service elements of national security policies, where such service elements include such things as hardware form factors, communication protocols, and on-line and off-line data definitions.

Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized. For example, it would be advantageous to provide a secure mechanism or establishing various classes of service and methods in connection with the use of cryptography and other features of the framework.

SUMMARY OF THE INVENTION

The international cryptography framework allows manufacturers to comply with varying national laws governing the distribution of cryptographic capabilities. In particular, such a framework makes it possible to ship worldwide cryptographic capabilities in all types of information processing devices (e.g. printers, palm-tops). Within the framework, a cryptographic unit contains several cryptographic methods (e.g. DES, RSA, MD5).

The invention herein is concerned primarily with the application certification aspects of the framework. It is a fundamental requirement of ICF that an application which requests cryptographic services from the ICF service elements is identified through some form of certificate to protect against the misuse of a granted level of cryptography. The levels of cryptography granted are described via security policies and expressed as classes of service.

The cryptographic unit, one of the ICF core elements, can be used to build several certification schemes for application objects. The invention provides various methods that determine the strength of binding between an application code image and the issued certificates within the context of the ICF elements. A key element with regard to the exercise of a cryptographic function concerns the special requirements for the trust relation that an authority specifies for the cryptographic unit. For example, any function exercised by the cryptographic unit must be controllable by the associated class of service which represents the security policy. The touchpointing concept discussed in this document for both the application and the firmware elements inside the cryptographic unit plays a key role in exercising control over the functioning of these modules (see, for example U.S. patent application Application Certification For An International Cryptography Framework, Ser. No. 08/702,331, filed Aug. 23, 1996, and U.S. patent application Method and Apparatus For Trusted Processing, Ser. No. 08/702,332, filed Aug. 23, 1996).

Another fundamental requirement of the ICF architecture is that the application is assured of the integrity of the cryptographic unit from which it is receiving services. Thus, the invention also provides methods that allow a determination of whether or not the cryptographic unit has been replaced or tampered with.

BRIEF DESCRIPTION OF THE DRAWINGS

FIG. 2 is a block schematic diagram that introduces additional management elements of the ICF according to the invention;

FIG. 3 is a block schematic illustration of the ICF and certification requirements according to the invention;

FIG. 13 is a block schematic diagram that shows the software component certification process during the installation stage according to the invention;

FIG. 14 is a block schematic diagram that shows the software component certification process during the execution stage according to the invention;

DETRILED DESCRIPTION OF THE INUENTION

National cryptography policy often varies by industry segment, political climate, and/or message function. This makes it difficult to assign one uniform policy across all industries for all time. Consequently, the flexibility of a cryptography framework that incorporates a national flag card, i.e. policy, is very attractive. The invention is therefore primarily directed to resolving problems surrounding international cryptography. However, the invention is adapted to, and intended for, many other applications.

Figure 1:
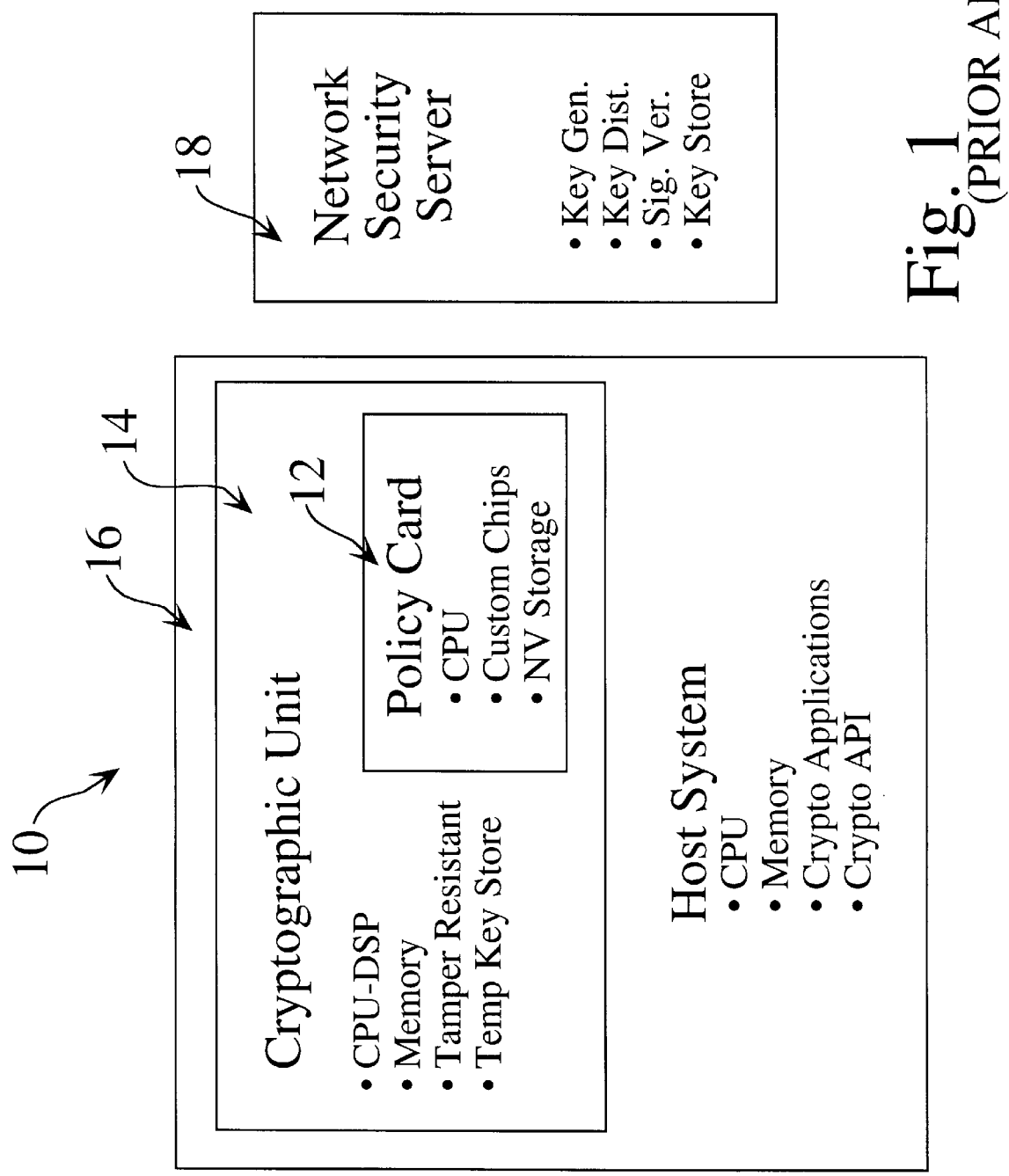
FIG. 1 is a block diagram of an international cryptography framework, including a national flag card, a cryptographic unit, a host system, and a network security server.

The invention preferably resides within the context of an international cryptography framework that has four service elements, each offering different types of services. FIG. 1 is a block diagram of the international cryptography framework (ICF) 10, including a national flag card (also referred to herein as a "policy card" (PC) and as a "policy") 12, a cryptographic unit 14, a host system 16, and a network security server 18. It should be appreciated that various of this ICF elements may be combined within a common environment, e.g. the cryptographic unit and policy card may reside within the host system. For example, the cryptographic unit, policy card, and host system may comprise a single integrated circuit, e.g. in a printer.

Host System (HS). The system or unit that contains a Cryptographic Unit (CU). This element of ICF supports an Application Programming Interface to a CU. It also supports applications that are security aware and that make use of the CU. These applications are bound tightly to the CU during runtime.

Cryptographic Unit (CU). The system or unit that contains the cryptographic functions. These functions are dormant and cannot be used by the HS until activated by a PC. The cryptographic functions included in the CU are determined by business demand. The CU is tamper resistant to protect any keying material that may be stored therein. It is the CU's responsibility to maintain contact with a PC. Failing to do so results in the decay of the CU's functionality.

Policy Card (PC). The system or unit that contains cryptography usage policy. Specifically this element of ICF contains parameters that govern the use of cryptography in one or more Cus that are known to this PC. Furthermore, this element is responsible for responding to the Cus heartbeat challenge.

Policy cards can be implemented in either physical or virtual form. A physical policy card requires hardware support inside the CU, which then engages with the PC in a heartbeat relation. Hardware level touchpoints, the method of disabling the hardware cryptographic functions (see Klemba et al, Cryptographic Unit Touch Point Logic, U.S. patent application Ser. No. 08/685,076, filed 23 Jul. 1996), must be implemented for a physical policy card. A virtual policy card (VPC) operates in conjunction with a hardware or a firmware implementation of the touchpoint techniques. In the VPC scenario, policy distribution involves the network security server.

Network Security Server (NSS). The system or unit that acts as a trusted third party to provide network security services to HSs, Cus, and PCs. These services can include policy enhancements, policy distribution, unit verification, adjustments to authorizations, and key management services.

ICF Management Framework. Peripheral to the core elements of ICF are the manufacturers of the cryptographic equipment and the domain authorities which implement the policy definition and enforcement through the framework. FIG. 2 is a block schematic diagram that introduces these additional management elements of the ICF.

There are four basic elements within the administration framework. These are the Security Domain Authority 20, the Application Domain Authority 22, the Host System Elements 16, and the Network Security Server 18.

The following definitions apply with regard to the discussion herein:

Manufacturer. The manufacturer is the actual producer of cryptographic equipment. The manufacturer shares information with the security domain authority about each lot of Cus manufactured.

Security Domain Authority. The security domain authority (SDA) is the institution which defines the security policies governing the domain. Security policies are presented to the other framework elements via classes of services (COS). Knowledge of manufacturing information allows the creation of classes of services targeted to a deterministic set of Cus.

Application Domain Authority. The Application Domain Authority (ADA) acts as the authority that creates certificates for the application. The certificate contains the granted classes of service to the application as they were granted by the SDA.

Network Security Server. The Network Security Server (NSS) acts as the trusted on-line authority that manages policy activation for a given CU.

Host System /Application /CU. The host system on which the applications are installed and on which the CU services are used form the execution elements to be controlled by the framework.

The two domain authorities are shown at the top of FIG. 2. The security domain authority (SDA) is responsible for granting a set of classes of service 26 to the application domain authority. The SDA is also responsible for issuing policy cards which contain the COS information and the touchpoint data for the CU. The SDA manufactures this information upon request from the site which installs the CU into a host system.

The application domain authority (ADA) receives the COS elements granted by the SDA. It has the responsibility of issuing application certificates 28 to applications 29 that belong to its domain. An application certificate contains an application ID and the COS granted by the ADA.

Applications receive a certificate from the ADA, which must be presented to the CU to receive the desired COS level. The CU, upon receiving the request, uses the certificate to determine whether the application has the right to access the requested cryptographic function. If the COS requested via the application certificate matches the COS granted by the SDA to the ADA, and stored in the policy card, the request is handled, otherwise it is not handled.

The touchpoint data are the information that is stored on the policy card 12, and which enable the cryptographic hardware for the defined classes of service. Periodically, this information is recomputed by the CU and validated by the policy card. Any mismatch causes the cryptographic capability of the CU to decay.

The network security server 18 (NSS) acts as an on-line instrument for policy negotiation and changes to the policy information stored on the policy card. Adding a class of service to the set of services normally requires the issuing of a new policy card containing the changed information. Alternatively, the NSS performs the update of the policy card on behalf of the SDA.

The NSS also plays the role of distribution of virtual policy cards (VPC). VPC implementations must contact the NSS at defined points, e.g. system startup to retrieve the COS information. There are COS attributes which define exactly when a CU must contact the NSS.

Basic ICF Architecture Assumptions. The ICF architecture rests on a few very basic assumptions about the core elements. They are as follows:

Certification. All software elements, whether they are firmware components installed inside the CU or applications using the services exported by the CU, are guarded by a certificate. Any operation, e.g. the downloading of firmware modules or an application for a certain level of service, involves the validation of this certificate.

Thus, one technique that is exploited to advantage by the invention to enhance security within the framework is to require certification at various points. The use of certificates in general is known. See, for example ITU-T Recommendation X.509(1993).

The X509(93) certificate format is as follows:

Certificate=SIGNED SEQUENCE {
version [0] version DEFAULT v1,
serialNumber CertificateserialNumber,
signature AlgorithmIdentifier,
issuer Name,
validity Validity,
subject Name,
subjectPublicInfo SubjectPublicKeyinfo,
issuerUniqueld [1]IMPLICIT BIT STRING OPTIONAL,
subjectuniqueld [2]IMPLICIT BIT STRING OPTIONAL
}.

Two variations in the existing X509(93) specifications are of interest in connection with the invention:

The effort to drive the unique identifiers across domains based on the hierarchical nature of the authorities interconnection, for example in the process of validating a certificate or a policy as referred in *Constructing X509(93) certificate UniqueIdentifiers from specific certification system semantics*, Dept of Computer Architecture—Uriversitat de Politectnica de Catalunya Barcelonia (Oct. 94) (also an EWOS reference EWOS/EGSEC/94/183); and *Working Draft for extensions to X509/ISO/IEC 9594-8 certificate definitions* (Jul 94) (also an EWOS reference EWOS/EGSEC/94/168). Policy IDs are registered by community interest groups, such as NSA and SCSSI; or by private organizations, such as the Software Publisher's Association or Microsoft Corp. of Redmond, Wash.

The couple-identified policies and authority constraints, as referred to in *Working Draft for extensions to X509/ISO/IEC 9594-8 certificate definitions* (Jul 94) (also an EWOS reference EWOS/EGSEC/94/168) are well suited for cross-certification of compatible policies between governments. For example the local domain policies that the herein described class of service is expressly recognized as supporting, once mentioned in the extension field, may or may riot be usable with other policies as well, and therefore facilitates the recognition of compatible policies. An application of this aspect of a certificate is the Internet policy certification authority, which could cross-certify a private organization policy using this scheme.

Extensions for the policy or certification system semantics can be found in the Uniqueld field suggested by *Constructing X509(93) certificate Uniqueldentifiers from specific certification system semantics*, Dept of Computer Architecture—Universitat of Politectnica de Catalunya Barcelonia (Oct. 94) (also an EWOS reference EWOS/EGSEC/94/183). The Certificate Extension fields called policies field or authorityconstraints field as defined in *Working Draft for extensions to X509/ISO/IEC 9594-8 certificate definitions* (Jul 94) (also an EWOS reference EWOS/EGSEC/94/168) would satisfy the second requirement.

Providing Cryptographic Functions. A system which implements the physical policy card scheme, requires the CU to implement hardware touchpoints. The CU does not provide the HS with any cryptographic functions without entering into and maintaining contact with a PC. A system which implements the virtual PC scheme requires the presence of an NSS. There must be at least an initial contact between the NSS and CU to distribute the VPC. The CU may also be required to contact the NSS on a regular basis that is determined by COS attributes which describe the policy life cycle.

Separation. Under no circumstances can user data that is processed within the CU be accessed by the policy elements, regardless of whether the policy card is a physical or the virtual policy card. Likewise, under no circumstances should the host system have access to the policy elements related data such as touchpoint data information.

Control. The CU or CUs controlled by a given PC or VPC is deterministic, i.e. every event, act, and decision of the CU is the inevitable consequence of antecedents that are independent of the PC.

ICF Basic Trust Requirements. FIG. 3 is a block schematic illustration of the ICF and certification requirements. The ICF environment depends on a method of validating that an application 29 rightfully executes a certain level of cryptography as it was granted by the application domain authority in the form of a certificate containing the valid class of services. A tight binding of the application to this certificate is therefore an important element of the ICF. The process of establishing this trust is referred to as application certification throughput this document.

Application certification describes two major elements of establishing trust between the application 29 and the cryptographic unit 14.

The first part concerns the process of analyzing a piece of data to determine that it has not been tampered with. In general, two main classes of objects are of interest. The first class concerns the subject of program image certification. The second class generalizes the process and applies the concept to a variety of data objects. The characteristics of the CU, namely a tamper-resistant functional unit, allow for the construction of general certification methods of arbitrary data objects.

From an application perspective, the application must be assured of the identity of the CU. The process of establishing this kind of trust is referred to as CU validation throughout this document. CU validation concerns the process of assuring the application that the CU has not been tampered with, i.e. it has not been replaced with a bogus CU. After the process of CU validation, the application can assume that the correct CU is performing the requested cryptographic services.

Certification of Code Images. For critical applications, there has long been a need to validate that an application has not been tampered with. Performing this validation usually involves a trusted load subsystem. A trusted load subsystem is the part of the operating system which is responsible for loading a program image into the system memory space and, while doing that, validating that the application has not been tampered with. Mechanisms, such as a checksum over the program image, are commonly used for this purpose. In such applications, if the checksum does not match the checksum stored by the loader subsystem at application installation time, the load fails and the program image is not loaded.

A trusted loader subsystem cannot exist independently from a relationship to the operating system. Trusting the loader to validate that the application has not been tampered with, implies that the operating system trusts the loader. A trusted kernel which is validated at system boot time, usually by a piece of hardware, builds the core of the trust hierarchy on which the application resides.

A CU also includes firmware elements 27 (see FIG. 2) which implement the CU runtime, cryptographic service modules, and potential user level service module that implements security protocols or other user level functions. The requirements that apply to application certification also apply to the firmware. Thus, firmware modules which are loaded into the CU are accompanied by a firmware certificate 25 (FIG. 2).

Certification of General Objects. Validating a code image to determine the rightful usage of a certificate can be generalized to validating any object governed by a certificate. For example, an Internet applet as they are provided for World Wide Web applications through the JAVA programming language, could also take advantage of the scheme described herein. Any object to be used or accessed could be accompanied by a certificate. The validation step is very similar to the steps performed by a trusted load subsystem for code images.

CU Validation. CU validation describes the process of ensuring that the application requesting cryptographic services is assured about the identity of the CU. There are several methods which can accomplish this task, e.g.

Challenge the CU. In this methods the application issues a puzzle to the CU that only the CU can resolve. The fact that the CU could resolve the puzzle is proof of the identity of the CU.

The CU prepares the application to function. In this approach, the application is shipped to the target system in a scrambled form. For example, the binary image could be encrypted. Only the CU which has the correct decryption key can unscramble the application, and hence it is a valid CU.

The second method has additional applicability for software copyright schemes. Sending the application in encrypted form to the target side and letting the CU decrypt the program does not only reveal that the CU is a valid CU, but also allows the software manufacturer to send out an application tailored to that particular CU. i.e host system. Unfortunately, once decrypted the application image is available in the clear and can be copied to other systems with little or no effort.

The ICF foundation allows for a method which is referred to as software level touchpoints and which addresses both the CU validation aspects of the invention, as well as copyright protection schemes. The concept of software level touchpoints is explained in greater detail below.

ICF Administration Concepts. The ICF model implements a policy scheme in which the application requests a class of services which ultimately define the level of cryptography allowed in the application. The following is a discussion of the concepts of policy and class of service and how the administrative elements SDA, ADA, and NSS, interplay in the definition and distribution of policies.

Figure 4:
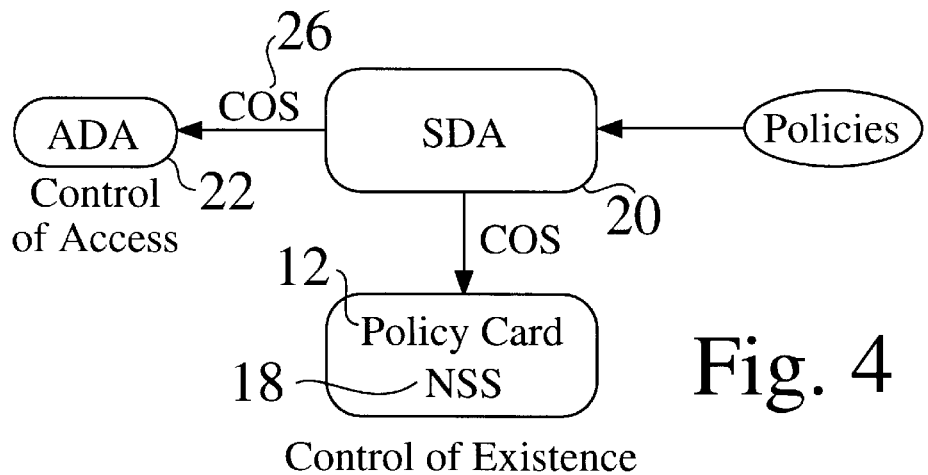
FIG. 4 is a block diagram showing the relationship of the administration elements of the ICF, i.e. ADA and SDA according to the invention.

Policies and Class of Service. FIG. 4 is a block diagram showing the relationship of the administration elements of the ICF, i.e. ADA and SDA. The ICF is a policy driven implementation of cryptography. A policy is the formal definition of the level of service that is granted in form of classes of services. For example, in response to a business requirement to have a strong level of cryptography for an Email application, a security domain authority may create the class of service "DES 128bit." ADAs asking for this strong level of cryptography are given the COS defined to implement this policy.

The security domain authority defined in the ICF administration framework is the element that creates classes of service from policies defined to meet the authorities' security interests and requirements. A COS has a unique identification, i.e. a serial number, that is not to be reused by this authority, and that has to be understood semantically by other SDAs in a function of cross-certification.

A COS 26 provided to the ADA 22 allows the ADA to issue application certificates for an application which contains the COS. This forms a path of access control. An application must have a certificate to access the method identified by the COS, e.g. a cryptographic operation at a certain strength.

The other path of control within the ICF architecture is the path of existence. The COS defined must be propagated to the CU to enable this service at a target CU. Even if the path of access indicates a valid access, the methods labelled by the COS must be in a present state for the request to be executed. If, for example, the COS is stored on the physical policy card and that policy card is removed from the CU, the associated methods no longer exist, i.e. they are not operating.

Control of access and control of existence of a method are fundamental to the ICF architecture and both should always be present in any implementation. Removal of the COS from the existence path results in a non-functioning method regardless of the access path evaluation result.

Policy Activation. Policy activation describes the order of events which must take place for a CU to offer services, as defined through the classes of service. Before an application can ask for a COS via the application certificate, the CU must be activated for this particular COS. The ICF is unique in the concept of policy controlled activation of cryptography.

Depending on the implementation, the cryptographic unit must be in connection with a policy card for the COS to be downloaded from the policy card. The VPC scenario requires a network connection to the NSS to download the COS to the CU. While these solutions are technically more or less equivalent, they have a profound implication for the trust model of the entire framework. A physical policy card based solution requires that the CU implements touchpoints in hardware. The main reason for this is the detachment of control in the physical policy card case. A physical policy card is not necessarily connected lo the domain authority environment and lesser control over the policy is possible once it is issued. To compensate for this, hardware touchpoints are placed in deterministic locations in the hardware, so that a policy card containing the touchpoint data can be loaded, but cannot be removed from the implementation without a decay of the controlled application.

A firmware implementation of the touchpoint concept operates in a much more dynamic way with regard to the location and installation of these touchpoints because the actual firmware to be loaded is not known a priori, thus leaving more room for the attacker. To compensate for this, an on-line element is present, in the form of the NSS, which allows for a more dynamic control of the firmware based touchpoint implementation.

Figure 5:
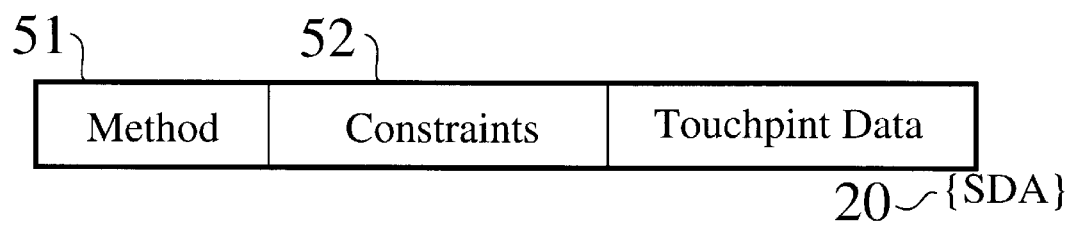
FIG. 5 is an illustration of the class of service structure according to the invention.

Classes of Service. FIG. 5 is an illustration of the class of service structure. A class of service (COS) describes policies. As discussed above, a policy is translated into one or more COS structures.

Classes of service are a structure signed by the issuing SDA 20. A COS also contains the touchpoint data necessary to control the touchpoint mechanisms inside the CU.

The method field 51 describes the actual method for which the class of service stands. Examples are cryptographic algorithm identifiers, but also any other defined method such as procedures for installation of components or execution rights for an operation associated with the COS.

The constraints field 52 describes attributes of the method. Examples are the attributes that govern the use of this class of service, e.g. the strength of the keying material used for the algorithm, the length of time this COS is valid, or the number of times it can be used. The touchpoint data field describes the touchpoint information needed by the CU to be activated for this COS.

Classes of service can be nested, i.e. a COS can contain as the method part other classes of services. Some classes of service, in particular the non-cryptographic classes of service, may not contain touchpoint data.

Common to all COS structures is also the concept of a decay policy. A COS can be declared to be valid for an unbounded lifetime or it may be limited in lifetime. Examples for a limited lifetime are a link of the COS lifetime to the lifetime of the OS, the application instance, or the context established with the CU. Restarting the OS or application, or closing the CU context, would rrark the COS as expired and invalid. Interaction with the NSS to activate the COS would then be necessary.

Other events which limit the lifetime of a COS are counters, e.g. the number of operations allowed by this COS, or even a single operation which is governed by this COS. The latter is a very powerful tool for creating classes of service for exactly one interaction, e.g. as would be useful for financial transactions.

Part of the CU implements the decay functionality in which classes of service are processed according to their decay policy. When the policy determines it is necessary to disable the COS, any associated functionality ceases to exist. The ICF CU is unique in that it offers cryptographic services driven by a class of service with constraints that do expire.

A special, predefined class of service, COSO, is used to guard the COS decay functionality. Because the COSO is itself subject to a decay policy, COS processing can be made cease to exist, thus describing the entire CU for any kind of service. A new activation from the NSS would be required in this case.

Classes of Service Levels. Classes of service are organized not only by the object they describe, but also by the level of validation an implementation performs before granting the service level described by the COS. The preferred embodiment of the ICF defines six validation levels for a COS. As the levels increase, tighter validation (and therefore control) over the service to be granted is achieved.

Figure 6:
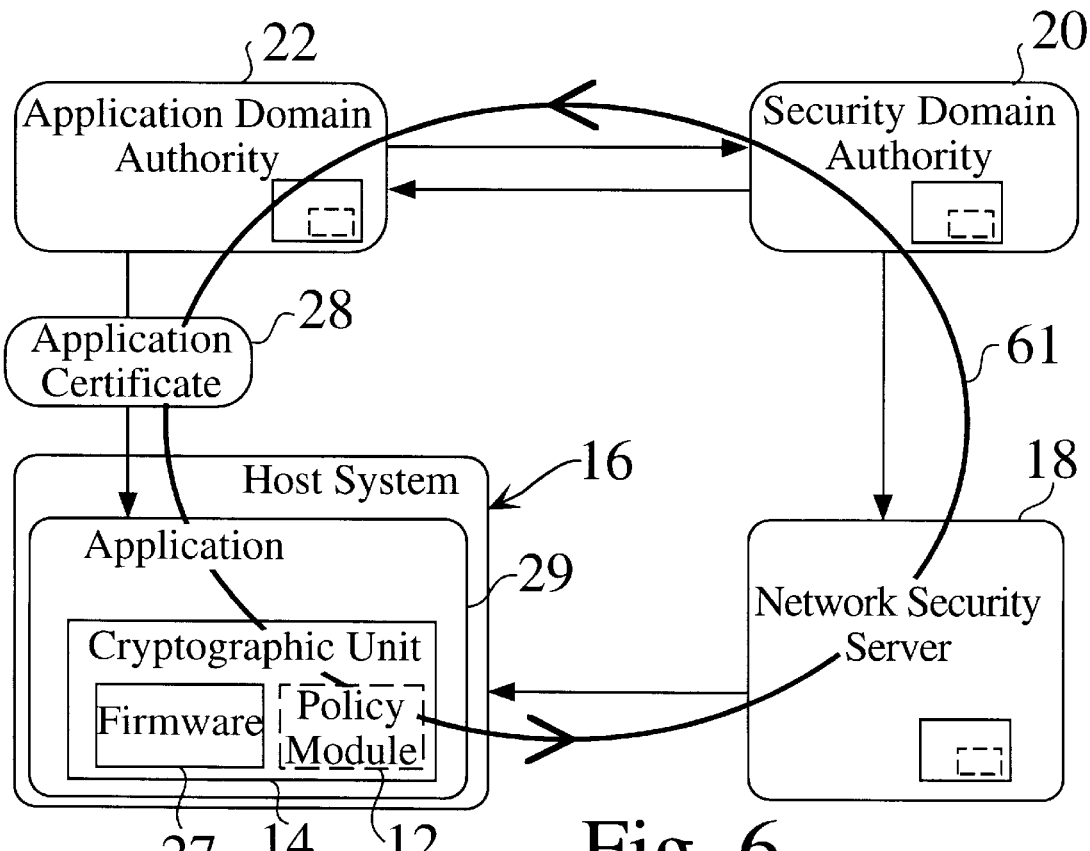
FIG. 6 is a block schematic diagram that illustrates the COS level concept according to the invention.

FIG. 6 is a block schematic diagram that illustrates the COS level concept. The ICF implements several levels of COS validation. These levels of COS validation are examples only. It will be appreciated that other levels of validation, and combinations thereof, may be provided in practicing the invention herein. They are labelled COS level 0 through 5. As the level increases, the amount of validation increases. FIG. 6 includes a counterclockwise circle 61 which shows the elements involved in the validation. At the lowest certified level, only the SDA origin of the COS is validated; while at the highest certified level, an on-line connection and authorization to the NSS for each operation is required.

COS Level 0. COS level 0 is assigned to applications to which a certificate is not assigned. Nonetheless, a minimum level of protection is provided at this level because the COS is signed by the SDA that issued the COS. This level is mainly intended for applications that cannot be changed to pass a certificate to the CU.

COS Level 1. COS level 1 validates the COS ID as it is made available through the application certificate signed by the SDA.

COS Level 2. COS level 2 adds to the COS level 1 the validation of the application certificate. The certificate is required to be issued by the ADA that asked the SDA for the COS identified by the COS ID.

COS Level 3. COS level 3 adds to the COS level 2 the validation of the application ID issued by the ADA.

COS Level 4. COS level 4 adds to COS level 3 the interaction with the NSS to validate the COS requested by the application.

COS Level 5. COS level 5 further strengthens COS level 4 by interacting with the NSS on each cryptographic operation requested by the application.

COS Level 6. COS level 6 adds the requirement of a token, such as a smart card, for any one or more of the interact actions set forth for COS Levels 1–5 above.

Figure 7:
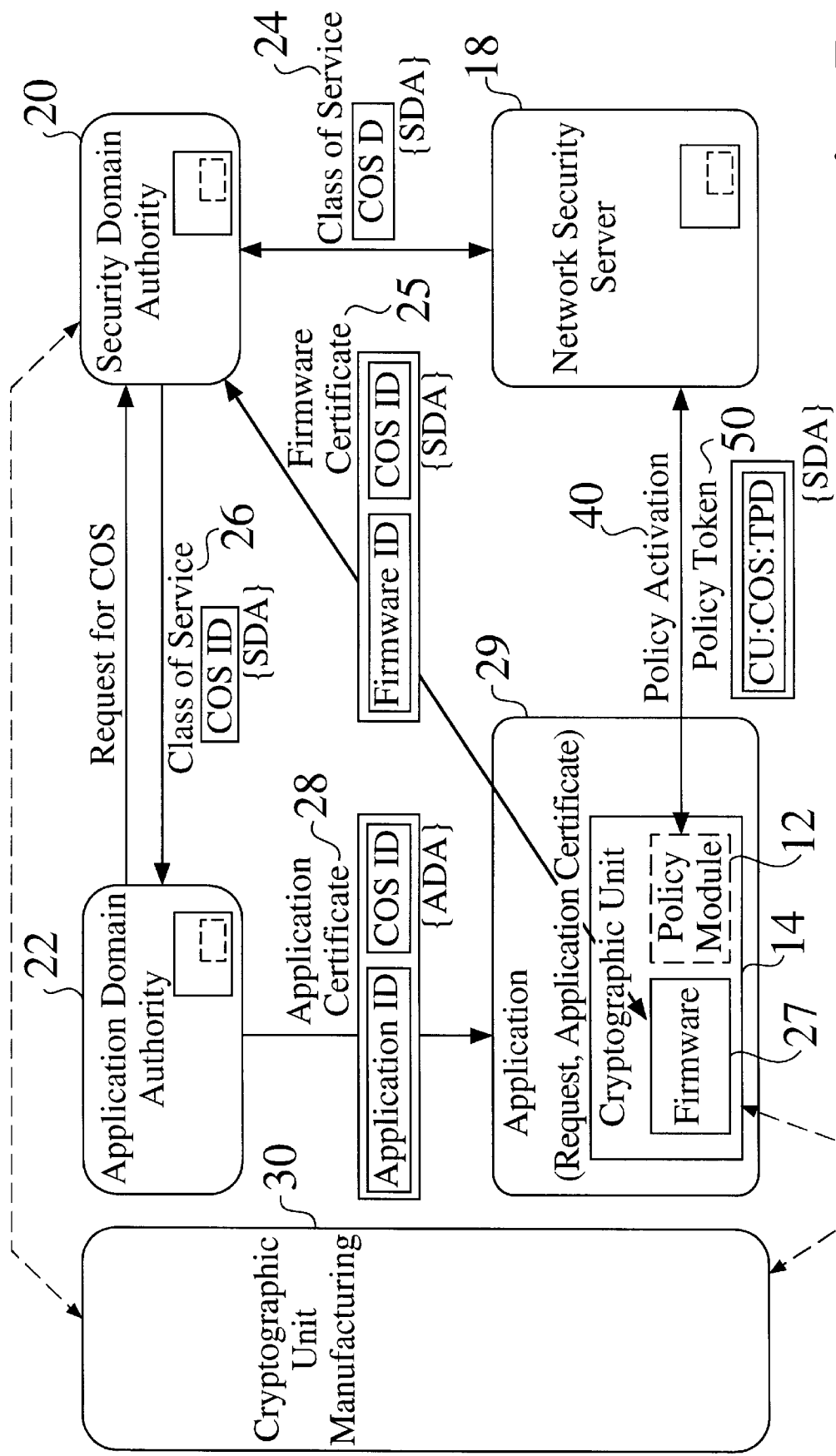
FIG. 7 is a block schematic diagram that illustrates key elements in the administration process according to the invention.

Flow of Information. FIG. 7 is a block schematic diagram that illustrates key elements in the administration process. Such elements include the application certificate 28, the class of service 24, 26, and the domain authorities that manage them. FIG. 7 includes both a high level view of these elements and their flow (as shown by the lines and arrows in the figure).

Figure 8:
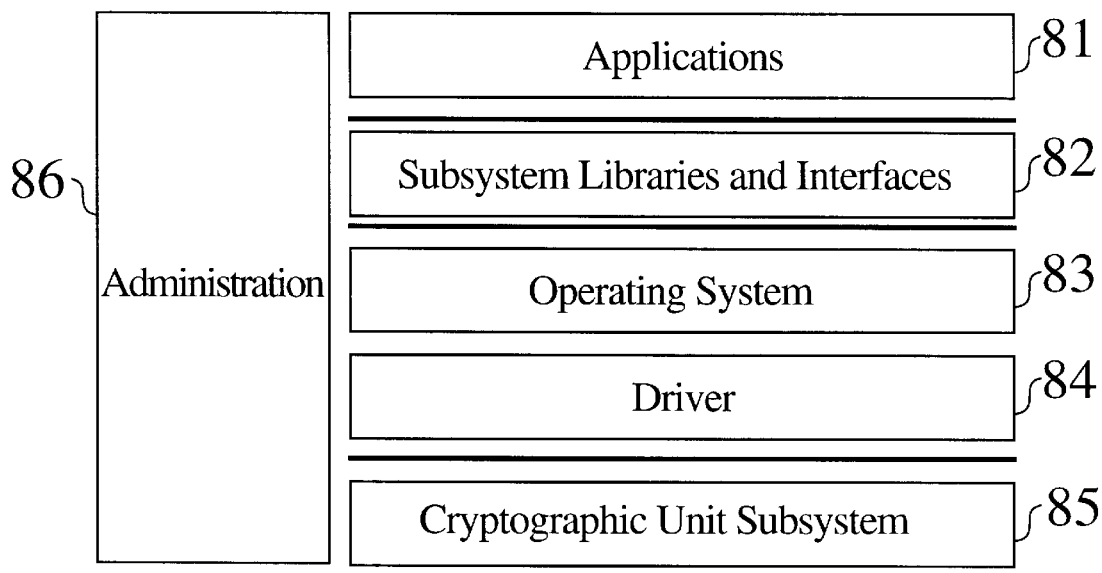
FIG. 8 is a software architecture overview of the ICF software environment. according to the invention.

ICF Software Environment. FIG. 8 is a software architecture overview of the ICF software environment. The ICF software architecture describes the layers of libraries and system elements which are needed to implement the ICF elements on a given host system. The following discussion provides an overview on the main software architecture elements:

Applications. The application layer 81 is the area of user written applications and libraries which need cryptographic services. An application may or may not be aware of these services. In case the application is aware, the subsystem layer 82 below offers a set of programming interfaces to the application. Cryptographically unaware applications do not issue any calls themselves, the underlying subsystem performs these calls on behalf of the application.

Subsystem Libraries and Interfaces. The are subsystems which support cryptographic functions for aware and unaware applications. These subsystems also provide APIs to the applications. Most notable APIs include the Microsoft CAPI for the Microsoft world, and the X/Open GSS-API and GCS-API for the Unix world. Subsystem libraries typically organize themselves into application programming interfaces and, shielded through the operating system, a cryptographic service provider module.

The subsystem libraries may also hide the security APIs completely from the application. This allows existing applications to take advantage of the solution without being modified. An example is the integration of the security features into transport level software subsystems.

Other elements of this layer may provide APIs for accessing the CU secure storage and execution facilities. For example, a database API such as the ODBC interface could be offered along with a data manager module inside the CU to provide a tamper resistant database.

Operating Systems and Drivers. The operating system 83 performs two primary tasks. One is to isolate the subsystem programming interfaces from the cryptographic service providers. The other task is to provide the necessary hardware control through a set of drivers 84 which interface with the cryptographic hardware in form of hardware drivers.

Cryptographic Unit Subsystem. This layer contains the hardware implementation and firmware elements of the cryptographic functions 85. The hardware is typically provided in several form factors, such an PCI card or a PCMCIA card, to accommodate the differ(3nt hardware platforms and performance requirements. The firmware is a set of libraries which implement a micro kernel runtime, the ICF functionality, as well as user downloadable software modules required by a particular application programming interface.

Administration. The administration element 86 is responsible for providing a management framework of the entire solution. This includes, for example, middleware components for administrative functions such as certificate management, application class of service management, and downloading of application specific extensions to the CU.

The key elements are divided into two groups: host system software and cryptographic unit firmware. Between the two major blocks is the definition of a command set which is used to communicate requests from the host system to the cryptographic unit and vice versa. Each of the main elements is described in more detail below.

Host System Software. The host system software consists of application level programming interfaces, system level drivers, and utility programs which help in configuring and managing the subsystem. This portion may look different depending on the target platform and interfaces selected.

Subsystem Libraries. Application uses the cryptographic unit through one or many APIs. APIs may already exist, new ones are being proposed as "standards," yet others need to be developed to take advantage of the full capabilities of the cryptographic unit. An example would be the ability to download and execute code dynamically in a trusted environment.

The cryptographic unit operates in conjunction with a wide range of programming interfaces. APIs may also be hidden from the application in form of subsystem libraries or middleware layers which mask the cryptographic operations.

Host Driver. The host system must integrate the cryptographic unit into the operating environment. From a software perspective this includes the device drivers and any configuration software needed to install, configure, and manage the policy card.

Management Utilities. Utility software is responsible for installation, management and configuration of the cryptographic unit subsystem. It is also necessary to provide utilities for developing service modules, and utilities for downloading these modules into the cryptographic unit.

Cryptographic Unit Command Set. The host system software communicates with the cryptographic unit through a set of requests. Examples for requests are the download of a service library or the encryption of a data buffer. To support multiple platforms with the same cryptographic unit, the command set should be the same and have the same format for all target platforms. The main benefit is a single implementation of the cryptographic unit software layers.

The command set itself can be divided into main categories. The first category offers commands which map to the available functionality of the cryptographic unit, such as the execution of a hash algorithm. The second category concerns commands between the host software and the service layer software inside the unit. The content of these commands is largely unknown to the firmware and they are routed to the appropriate service layer.

ICF Application Programming Interfaces. The ICF introduces the concept of policy driven cryptography. Application programming interfaces allow to select the desired services based on the application certificate granted by the ADA. This is in contrast to the currently available cryptographic programming interfaces. Most of the current cryptographic APIs are built around the concept of a cryptographic context. Applications establish this context before they can use any cryptographic service. No linkage is done between the application and the class of service offered by the CU. For example, the Microsoft CryptoAFI, offers a programming interface which allows the user to select the cryptographic service provider (CSP) type and load the software module into the system. Thereafter, an application can make calls to the CSP and use its services. There are, however, no methods to distinguish cryptographic functions based on what the application is doing.

Figure 9:
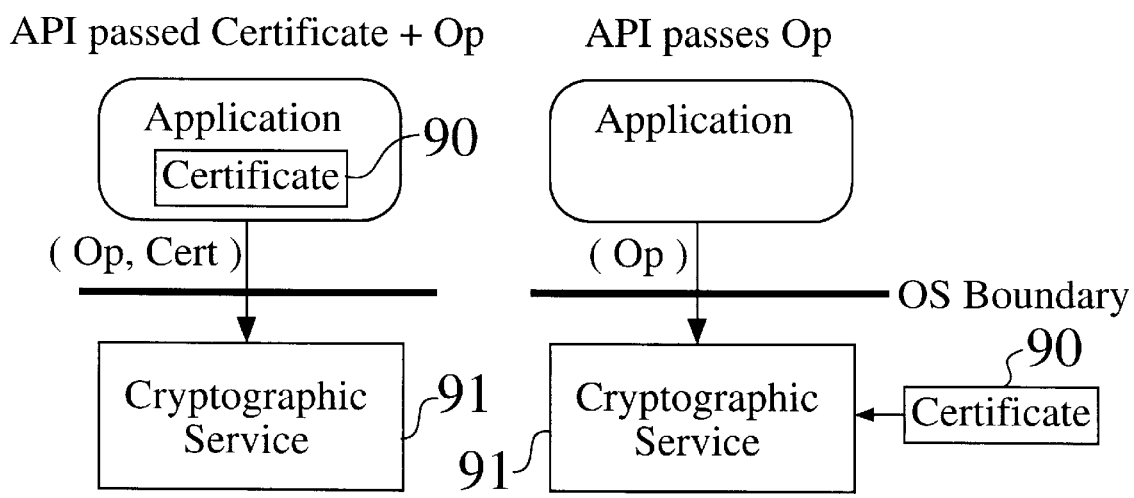
FIG. 9 illustrates the methods available to pass certificates to the service provider responsible for executing the requested functions according to the invention.

FIG. 9 illustrates the methods available to pass certificates 90 to the service provider 91 responsible for executing the requested functions. There are several methods for making the certificate available to the cryptographic unit, e.g.:

Certificate passed in each call. The certificate can be passed in each call to the CSP. This scheme allows for an application which may pass more than one certificate or the task to be accomplished. For example, if an application is allowed to use strong encryption for financial transactions and at the same less strong encryption for E-mail functionality, that application can select dynamically the level of cryptography by passing the corresponding certificate.

Certificate passed at initialization time. The certificate can also be passed when the link to the CSP is established. An application using multiple certificates could establish multiple contexts, one for each certificate, and use the appropriate one in the cryptographic function calls.

Certificate implicitly available. The certificate is transparent to the application and available to the cryptographic layers. For example, the application passes its name which is used to index into a registry that contains the certificate for this application.

All of these methods rest on the assumption that there is a tight binding between the application and the certificate. This concept is referred to as application certification throughout this document. As discussed below, the CU plays a critical role in establishing this tight binding.

ICF Cryptographic Unit. At the core of the ICF framework is the CU. An implementation of the CU provides a set of services to the host system. These services include cryptographic functions but also other functions, such as storing sensitive information that take advantage of the tamper resistant characteristics of the CU. The following three broad categories of services are offered by the CU:

Cryptographic functions. The main purpose of the CU is to provide cryptographic functions. The unit hosts hardware and software to carries out the defined cryptographic algorithms. It also hosts hardware and software which enforces a certain cryptographic policy.

Secure storage. Secure storage allows the CU to store information in a secure manner inside the CU. This facility is primarily used for the storage of keying material inside the CU. Over time, application and subsystem layers may also take advantage of this facility by staring other non-security related material inside the CU.

Secure execution. The CU allows for the execution of code in the secure and tamper-resistant environment of that unit. Applications and subsystem layers may take advantage of this facility to implement a portion of their functionality, such as security protocol handlers, in this secure environment.

Figure 10:
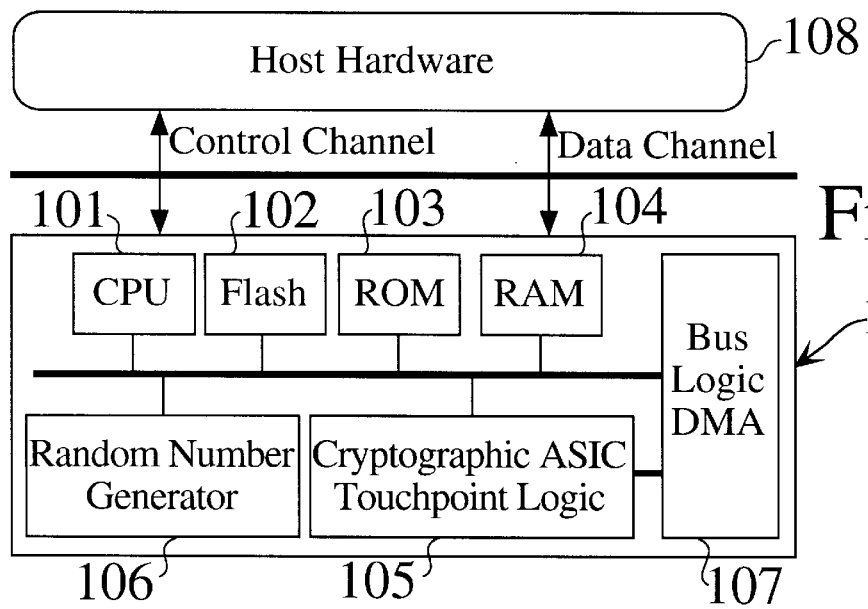
FIG. 10 is a block schematic diagram that illustrates an exemplary architecture of the CU according to the invention.

ICF Cryptography Unit—Hardware. FIG. 10 is a block schematic diagram that illustrates an exemplary architecture of the CU. FIG. 10 does not refer to a particular physical implementation, but rather shows the main elements needed inside the CU to implement the three broad categories of functionality outlined above. There are several components which form the CU:

Central Processing Unit. The CPU 101 is the heart of the unit controlling all information flow. Modules downloaded for secure execution are executed by the CPU.

Storage Elements. The CU 14 needs several storage elements. The Flash memory 102 is the storage area for programs and nonvolatile data stored in the CU. The ROM storage 103 hosts the bootstrap code which executes on reset of the CU. The RAM storage 104 hold the volatile data of the CU.

Cryptographic ASIC 105 and Random Number Generator 106. These two elements perform the basic operation operations for the cryptographic functions offered by the CU. For implementations which provide touchpoints in hardware, ICF touchpoint logic for enabling these functions in the presence of a policy card can be found in these elements.

Bus Logic. The Bus logic 107 interfaces the unit with various other interfaces to the host system. Two main channel exits towards the host system 108. The first channel, i.e. the control channel, is used for commands and status messages between the calling system and the CU. The data channel carries out the actual data transfer.

Figure 11:
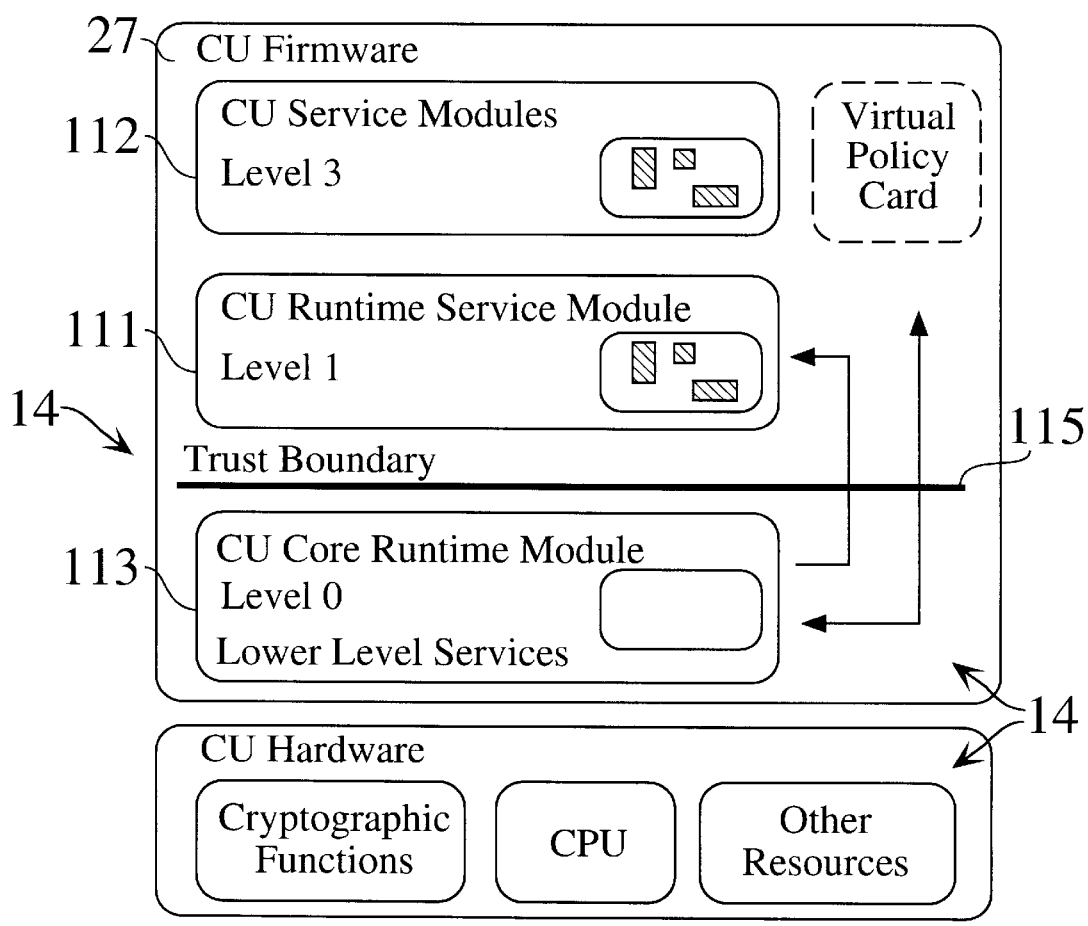
FIG. 11 is a block schematic diagram of the cryptographic unit firmware according to the invention.

ICF Cryptographic Unit Firmware. FIG. 11 is a block schematic diagram of the cryptographic unit firmware. The CU firmware 27 is the software which resides inside the cryptographic unit 14. There is a core runtime module 113 which controls the overall operation of the unit, kernel services layers 112 which implement security policies and control access to the cryptographic functions, and service library modules 111 which closely interact with the hosts system applications to implement application specific security services and policies.

The firmware components can be divided among a sharp line which is called the trust boundary 115. Below the trust boundary, the CU core runtime and the actual hardware can be found. Above the trust boundary, the CU runtime managing the entire chip and upper level service modules can be found.

CU Core Runtime. The CU core runtime implements the low level services which shield the underlying hardware. It also offers services to the support layers to manage the resources offered by the CU, e.g. memory objects for code module storage. The CU core runtime is responsible for the COS processing. Each operation requested by the upper layers is accompanied by a COS identifier. The COS decay policy is implemented below this boundary. The CU core runtime protection rests on the following key mechanisms:

ROM Code. All CU core runtime code is implemented in ROM storage. Benefiting from the tamper resistant nature of the CU, this code cannot be manipulated nor bypassed. The ROM is mapped into the CU processors address space to cover the reset and hardware interrupt vectors such that any reset attempt forces execution to be inside the ROM code boundaries. The ROM code runs at the highest privilege level of the CU processor.

Protection Architecture. The CU processor is required to implement at least two privilege levels. Memory objects allocated at the higher privilege level cannot be accessed by code running at a lower privilege level. This boundary is enforced by the CU processor hardware and cannot by bypassed under any circumstances.

Persistent Storage. The CU core runtime requires a certain amount of nonvolatile storage allocated at the highest privilege level only accessible to the ROM code. This storage is used for the COS processing and the touchpoint processing, as described in greater detail below.

All code introduced above the trust boundary is subject to touchpoint processing. The concept of touchpoint processing is discussed in more detail below. It is important to note that code above ceases to function if the touchpoint locations are not resolved by the core runtime during execution of this code.

CU Runtime Services. The CU runtime services provides the elementary operating system functions needed to manage and organize the card. It resides directly on top of the CU core runtime. This runtime may be thought of as a micro kernel which runs at high execution privilege level. This kernel is the only place which drives the cryptographic functions available for the higher level service modules. The following basic capabilities should be available:

Secure Loading. Due to the nature of the unit, some software modules loaded into the CU need to be validated before they can be loaded and executed. At load time the loader loads the code image and, if required, validates the signature of these modules. The secure loader is part of the kernel code and part of the CU core runtime. The kernel code itself is loaded and validated by the CU core runtime module.

Memory Management. The memory manager of the micro kernel is responsible for allocation and deallocation of main storage. Memory can be allocated at the different ring levels to ensure protection between the memory areas.

Tasking. The task handler provides the basic mechanisms for running multiple threads of operation. Incoming requests may trigger the start of a new task or are simply queued for an existing task to serve.

Internal Message Facility. If it is desired that the loaded modules need to communicate with each other, some basic form of inter task communication must be provided.

Crypto Paging. Crypto paging allows the memory manager to allocate storage outside the cryptographic unit boundary and store pages in encrypted form. This facility is needed if the amount of storage needed inside the unit exceeds what is available.

Access to internal Resources. Most of the other components, such as the cryptographic hardware on the chip, are accessed through routines that are part of the micro kernel.

External Interfaces. The cryptographic unit interfaces with the host system through this component, which is the entry point for an external requests. The requests are passed according to the defined command set are decode and passed along to the appropriate unit for execution. This layer may be dependent on the type of host system bus architecture.

CU Services. This set of libraries runs at the least privileged protection level. This level hosts libraries which could implement services for a given programming interface, such as the ICF Envelope APIs, cryptographic APIs, such as the Microsoft Crypto API or the X/Open GCS API, or any other APIs as needed to offer an abstraction for secure storage, secure execution, or downloading facilities. Commands exchanged between the host system and this layer are defined by the implementor of this layer.

The service libraries layer also offer the possibility of allowing an application to execute some portion of itself in a secure and trusted environment. This facility could be used to implement copyright schemes, or special functionality such as risk evaluation modules for financial applications. The programming interfaces are application dependent. The host system driver passes the information between and the application an the service libraries as messages.

Figure 12:
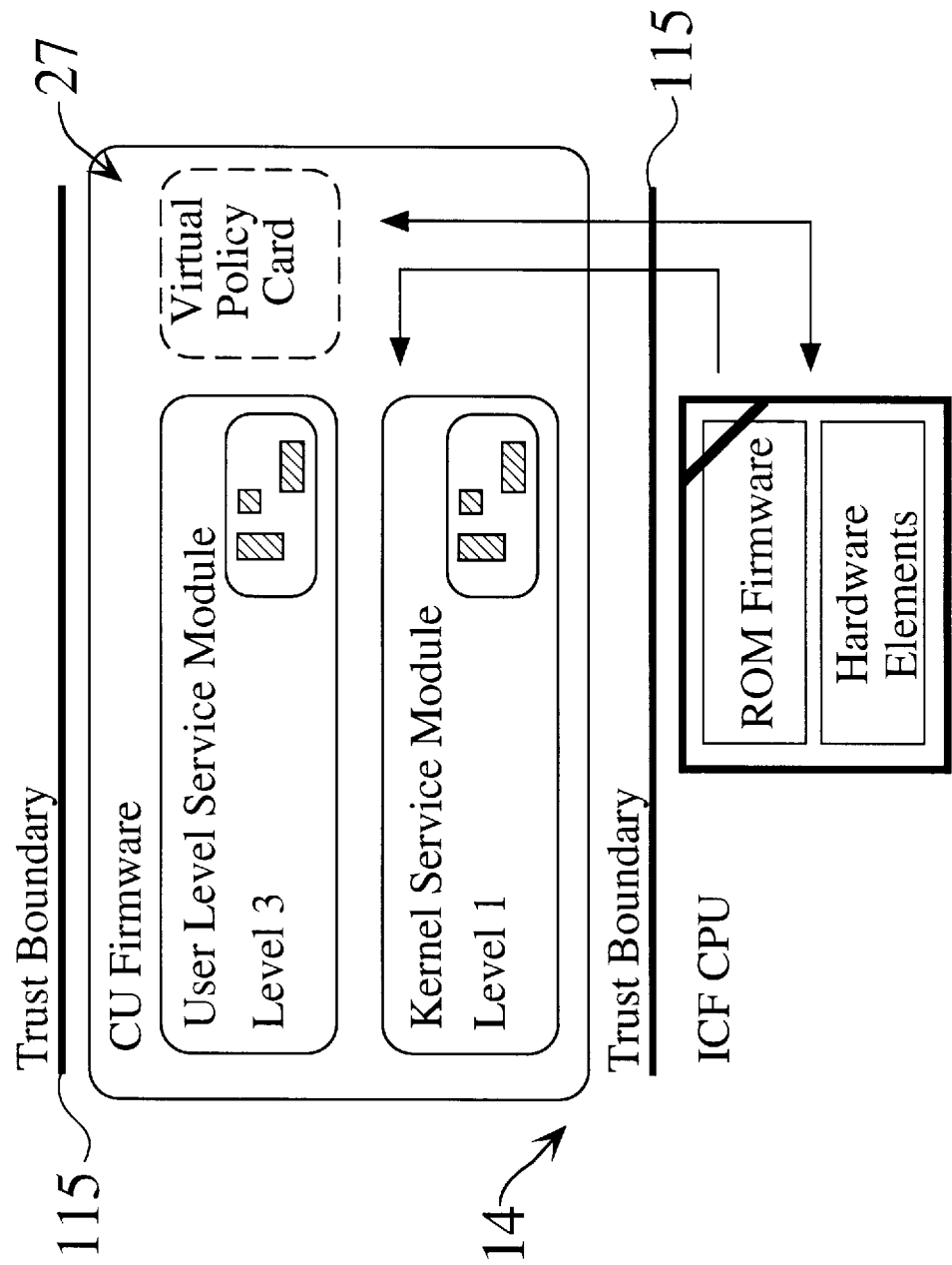
FIG. 12 is a block schematic diagram that illustrates the concept of a virtual CPU according to the invention.

Concept of the Virtual CPU. FIG. 12 is a block schematic diagram that illustrates the concept of a virtual CPU. Another way to look at the firmware structure discussed above is to combine the lower level firmware found in the CU core runtime and the underlying hardware into a virtual CPU executing under the constraints implemented by this combination.

The ICF CPU can be seen as a processor capable of executing instructions under the control of a policy. Part of this ICF CPU is concerned with the COS evaluation and the resulting touchpoint resolution process. Looking at the combination of the firmware and hardware elements as a joint unit allows a better description of the trust model, and evaluation of a hardware/firmware combination against it. Once this component is validated, analysis of any module loaded and executed on top does not have to be evaluated with all the lower layer interaction around touchpoints and memory protection intermixed.

Any physical processor model/ROM combination which can implement the protection mechanisms outlined above is therefore capable of being configured as a virtual CPU, as may be required by the ICF CU architecture. Any module written for such an ICF CPU can run on any ICF CPU that passes the strong security requirements.

Software Component Certification Process. Software component certification is the process of ensuring that there is a tight binding between the application image and the application certificate issued by the ADA. It also includes firmware components and firmware certificate issued by the SDA.

The process of software component certification can be described in two distinct stages. They are the installation stage and the execution stage. Whenever the term application is used in the following text, it shall also include the firmware components. The following is a brief description of the certification process stages.

Installation stage. The installation stage describes the steps necessary to introduce the application and the accompanying certificate to the CU.

Execution stage. The validation stage describes the steps taken to validate the applications identity based on the certificate passed along with the validation request. After successful validation the application enters the execution stage. At any time during this stage, the CU can issue a validation request to revalidate the application's claim.

Installation Stage. FIG. 13 is a block schematic diagram ihat shows the software component certification process during the installation stage. Certified Applications are introduced to the host system at the application installation stage. A certified application consists of the application image 29, i.e. the code file, and the certificate 28 issued by the application domain authority. The result of the installation stage is an application credential 130 which uniquely denotes the application, the CU, and the valid classes of services. This result is referred to herein as an application credential.

The purpose of the install process is to introduce the application 29 to the CU 14. A special utility program, the install program 135, is called to carry out the necessary work. The main task of this utility perform is to pass a reference to the program image and the application certificate to the CU. The CU upon receiving the request for installation uses its host system memory access capabilities to 25 compute a hash value from the program image.

The application certificate contains, among other information, the application ID 137 and the class of service 136 defined for this application. Using these two elements of information, the CU produces a credential which identifies the application, e.g. through a name, the hash value of the application image, and the class of service defined for the application.

The credential is then signed 138 by the CU and stored in local non-volatile memory inside the CU. If desired, the credential could also be exported to an external area. Because the credentials are only useful to the CU that generated them, it only needs to be ensured that the credentials have not been tampered with while outside the CU boundaries.

Execution Stage. FIG. 14 is a block schematic diagram that shows the software component certification process during the execution stage. In the execution stage, an application 29 is loaded by the operating system into the memory system and starts execution. At some point in the application execution., the application requests cryptographic services. Normally, the first step is to establish a context with the CU. An application passes the application certificate 28 issued by the ADA to the CU 14 when it establishes a logical association, e.g. a cryptographic context.

Upon receiving the request to establish an association, the CU validate the identity of the application based on the certificate passed. Through the operating system components, the CU has access to the application image and is therefore able to compute the signature of the application. For example, using the DMA capability and the knowledge of the memory address range of the application within the memory system, the CU can compute a hash value.

After validating the correctness of the certificate, the CU uses the certificate to locate the application credential 130 corresponding to the certificate. The credential contains, among other information, the computed signature 138 of the application image from the installation process described in the previous subsection. If the values match, two important facts can be deduced. First, the application's identity is established because the computed signature over this image matches the computed signature at installation time. Second, the application has not been tampered with since the installation stage.

After this initial validation step, the application can issue calls to the CU requesting cryptographic operations. At any time later on, the CU may decide to execute this validation process again. The options range from validating on a periodic basis to validating upon each request.

From an operating system perspective, no changes to the loader and the operating system are required to implement this scheme. The only requirements needed are the ability to access the memory image of an object. Implementations may however decide to invoke the CU at application load time to perform the validation step.

Certification of Firmware Components. Firmware certification is not fundamentally different from application level certification. Both share the objective of establishing a tight binding between the certificate and the software object. One difference that can be seen is that the lower level firmware objects are certified by the SDA rather than the ADA. High level firmware objects, e.g. user written protocol modules which are downloaded to the CU, are certified by the ADA.

Another difference is that any firmware module downloaded into the CU, whether a user written high level module or vendor supplied lower level module, is subject to the touchpointing process. This process is optional for application objects outside the CU boundary. The touchpointing concept is described in greater detail below.

Certification of General Objects. The scheme described in the previous subsection can easily be extended to cover not only code images but also any kind of data object which could make use of the validation method outlined. For example, the operating system itself, subsystem libraries, and static configuration information could be protected from unauthorized modifications or replacement by this scheme.

Figure 15:
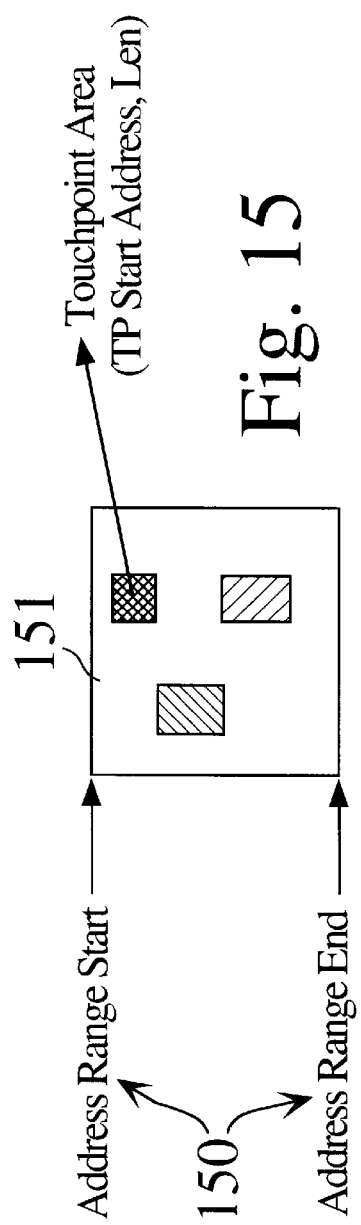
FIG. 15 illustrates software level touchpoints according to the invention.

Software Level Touchpoints. FIG. 15 illustrates software level touchpoints. ICF Software touchpoints are areas of data that are not usable to the host or CU system environment until preprocessed. One example of a software touchpoint is that of instruction sequences in a code image which have been transformed in a way that the instruction fetch unit of the processor cannot decoded them successfully. Similarly, there could be data areas which have been altered in a way that the original data is not accessible.

A software touchpoint is characterized by a starting address within the address range 150 of the object 151 and the length of the touchpoint. There are several classes of software touchpoints. Data level touchpoints describe an area inside a data object. No further information about the Touchpoint is recorded in the data object about this touchpoint. A separate data area describes these touchpoints outside of the data object.

Instruction level touchpoints describe touchpoints inside an instruction stream. There are two sub classes. The first subclass describes instruction level touchpoints similar to their data level counterparts. In this case, an area in the instruction stream is replaced by the touchpoint information. The second subclass describes instruction level touchpoints that have a structure. A structured touchpoint starts and ends with a special instruction Which demarcates the touchpoint area. All these types of touchpoints are described in more detail below.

Figure 16:
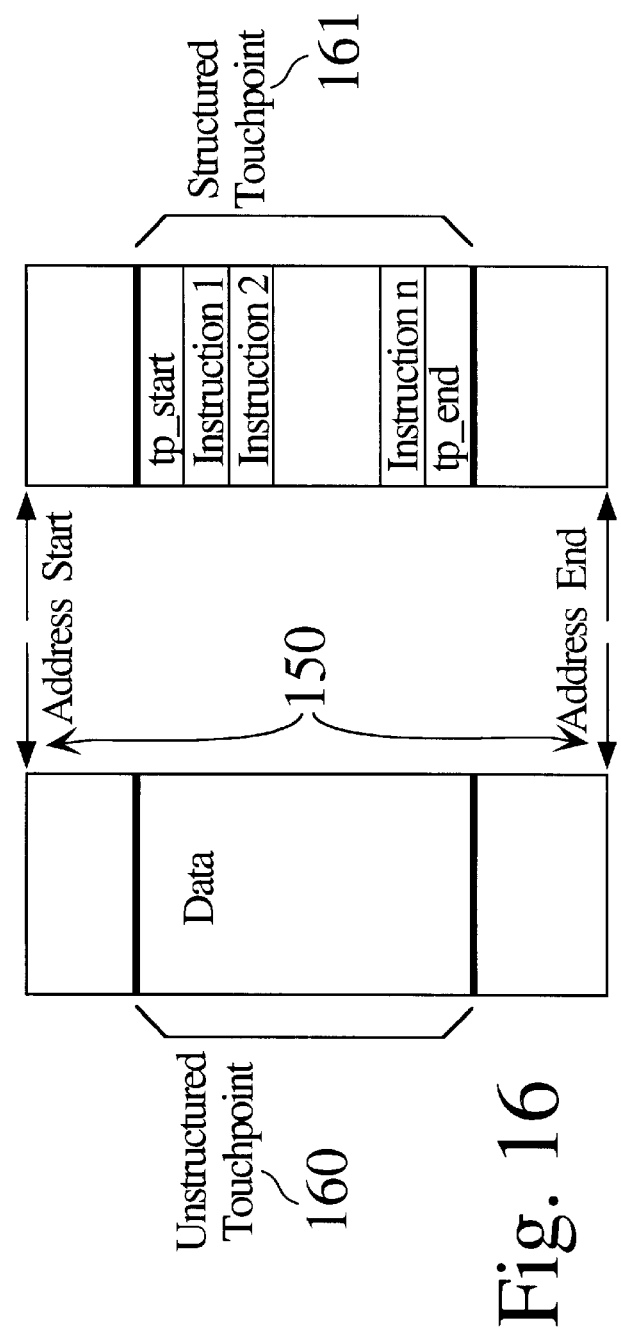
FIG. 16 illustrates instruction level touchpoints according to the invention.

Instruction Level Touchpoints. FIG. 16 illustrates instruction level touchpoints. There are two type of instruction level touchpoints. The first type 160 implements an instruction level touchpoint as a data area in the instruction stream which has be replaced by a scrambled version. No further information is available about the touchpoint at the location itself. The second type 161 implements the touchpoint with a distinct instruction at the beginning and an instruction at the end of the touchpoint area. To distinguish the two touchpoint areas, the first type of touchpoint is referred to herein as an unstructured touchpoint, while the second type of a touchpoint is referred to herein as a structured touchpoint Mechanisms for Implementing Instruction Level Touchpoints. This discussion concerns the implementation aspects of software level touchpoints. Depending upon the processor used and the hardware support available, touchpoints can be implemented in a variety of ways. Common to all implementations are the following aspects.

Resolving the Touchpoint. Resolving a touchpoint can be done in different ways. For example, a tp_start and tp_end instruction could demarcate a touchpoint area. The information in between is the touchpoint data to be transformed to the original instruction sequence. In the case of an instruction level touchpoint the data in between are instructions. The demarcation instruction could trap to the CU to resolve the touchpoint area and put it back into place again after the instruction sequence has been executed. By this, it ensures that, with the exception of operating system exceptions, no other code can be executed which could have access to the touchpoint area.

Alternatively, one could implement this touchpoint decoding function inside the instruction fetch unit of a CPU. A policy register could store the necessary decoding key for this application on context switch. Benefits of this approach include the transparency of the TP, combined with the benefit of making the code unusable for another system. This alternative is discussed more in connection with the discussion below of host system support for software level touchpoints.

Resolving a touchpoint can be done in a way that the touchpointed area is uses a mechanism for ensuring only the recipient, i.e. the one which can remove the touchpoint permanently, is the correct recipient for this touchpointed object. Resolving a touchpoint can also be done in a way that the touchpoint stays in place and is resolved only for the duration of the usage of the touchpoint area. This approach is used to implement the existence criteria of methods inside the CU. It is critical to leave the touchpoint areas permanently in place.

Selecting what to touchpoint. A touchpoint replaces a sequence of instructions. The implementation must provide an execution object in which the original instructions are to be executed. The sequence of instructions should be executed atomically. The sequence of instructions itself has to satisfy certain criteria. For example, branches outside of or into a touchpoint area require substantial support from the processor to detect when someone is inside a touchpoint area. Howevever, for strengthening the mechanism, this alternative is worthwhile to pursue.

There can be a very few or many touchpoint areas in a code object. From the set of possible touchpoints, an implementation can select at runtime a random set of locations to touchpoint. Also, to strengthen the touchpoint concept further, the set can be modified dynamically, i.e. touchpoints are added and removed randomly from the set. This defeats an attack in which one could locate the touchpoint areas and over time determine the original instruction sequence.

Detecting a touchpoint. Detecting a touchpoirited area requires a mechanism which allows the processor to detect the start and the end of such an area. For touchpoint areas that contain branches, each location must be flagged with such an indication. The processor's trap capabilities can be used to implement any of these mechanisms. The range goes from using a software interrupt instruction, over illegal operation codes to force an execution, to dedicated instructions such as the tp_start and tp_end instruction mentioned above.

Data Level Touchpoints. As with the unstructured instruction level touchpoint, any kind of constant data can be protected by this scheme. If the processor supports a data breakpoint mechanism, these areas can be located during the execution and resolved in a similar manner as the instruction level touchpoints.

CU Validation Process. Applications must be assured about the correctness of the CU. The objective is to avoid the scenario in which someone redirects the application requests to a different cryptographic function. The CU validation process describes the steps taken to assure the application about the identity of the CU. The validation process described in this chapter uses the software level touchpoints as the main concept used. CU validation can be described in three distinct stages:

Manufacturing Stage. The manufacturing stage describes the steps that must be taken at the application manufacturer side to create an application having the software level touchpoint information incorporated therein.

Installation stage. The installation stage describes the steps necessary to introduce the application and the accompanying certificate to the CU. Depending on the type of installation, the software level touchpoints may be removed at this stage or left intact within the application image to be resolved at execution time.

Execution stage. The validation stage describes the steps taken to validate the applications identity based on the certificate passed along with the validation request. After successful validation, the application enters the execution stage. At any time during this stage, the CU can issue a validation request to revalidate the application's claim. In addition to these application certification steps, the software level toijchpoints installed in the application must be removed or transformed dynamically as they are encountered by the host system processor. This is only the case if they have not been removed during the installation stage.

The CU validation process outlined below allows for additional benefits that go beyond the main goal of CU validation. From a software manufacturers perspective, issues concerning copyright protection are becoming increasingly critical in a network world. A software manufacturer therefore would like to be assured that the software shipped to a customer is not copied to another system. The range of requirements can range from ensuring that the software is loaded to only a valid group of authorized systems to customizing the software for exactly one system.

Figure 17:
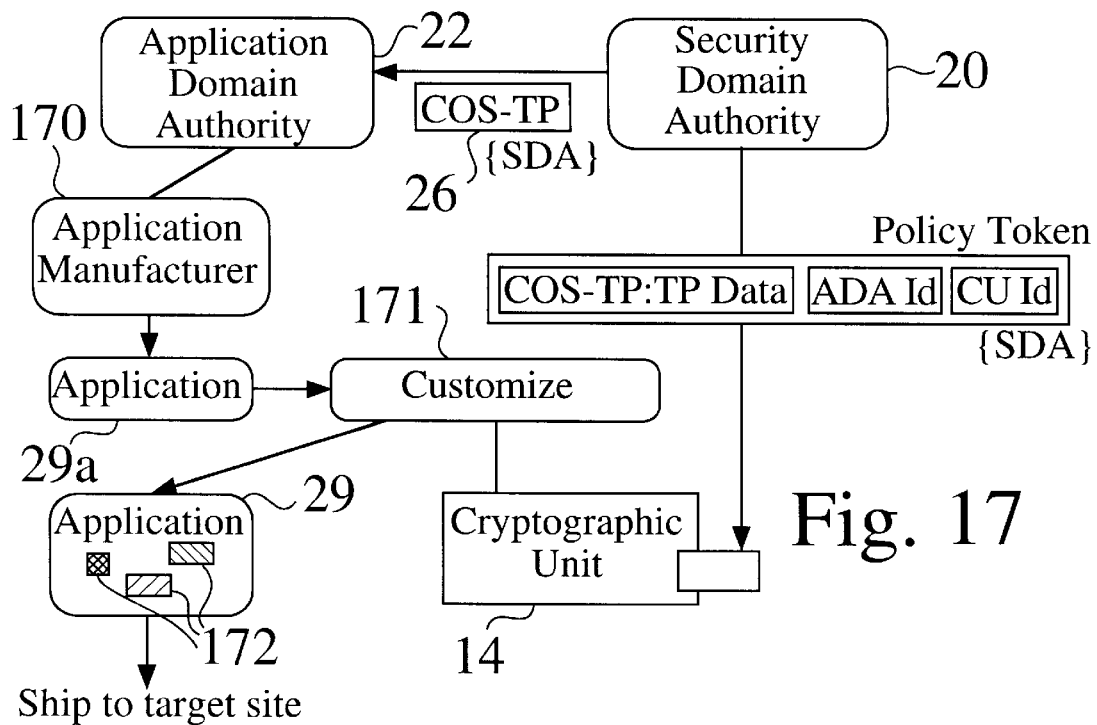
FIG. 17 is a block schematic diagram showing the manufacturing stage according to the invention.

Manufacturing Stage. FIG. 17 is a block schematic diagram showing the manufacturing stage. In the manufacturing stage, the application 29a is produced by the application manufacturer 170. The objectives are to build an application which can be tailored for the particular group of target systems or a single target system. The target system is identified by the CU installed in it.

The application manufacturer first develops the application. This is the executable version of the application for the target host system platform. Before the application can be shipped to the target host system, the customize step 171 installs the software level touchpoints. After the installation, the application 29 can be shipped. The customize component shown in FIG. 17 is responsible for installing the touchpoints in the application image.

The ADA 22 is the domain authority in which the application manufacturer resides. The ADA is granted a class of services by the SDA 20 which define the function used to install the touchpoints into the application image.

One point of the touchpoint installation is to produce a list of location and length of the touchpoint areas within the code image. In the case of unstructured instruction level touchpoints, this information is needed to locate the touchpoints. For structured instruction level touchpoints, this information is not strictly necessary. There are also considerations concerning exactly where a touchpoint could be placed and what the length of such as sequence should be.

For unstructured touchpoints the question of where exactly they are placed in the code image is of no real importance. Technically they can be placed into any area of the image. For structured touchpoints, there are more constraints. Restrictions include that touchpoints should, for example, not cross procedure boundaries, or overlay more than one basic block of instructions. The restrictions depend on the nature of the hardware level support for structured touchpoints. Some of these aspects are discussed elsewhere herein.

At the end of the manufacturing stage, there is an application image augmented with software level touchpoints 172. The touchpoints were put into the image in a rightful way because the COS which enables the operations inside the CU for the customize component was granted this right by certification from the SDA to the application manufacturer ADA. This process, so far, does not involve information about the target system. Any installation which has the capabilities to reverse the touchpoint information install process can derive a working application.

A further tailoring down of the target system requires additional knowledge about this system. Because this introduces a tighter dependency between the manufacturer and the target recipient, a higher effort is necessary on the administration side.

Figure 18:
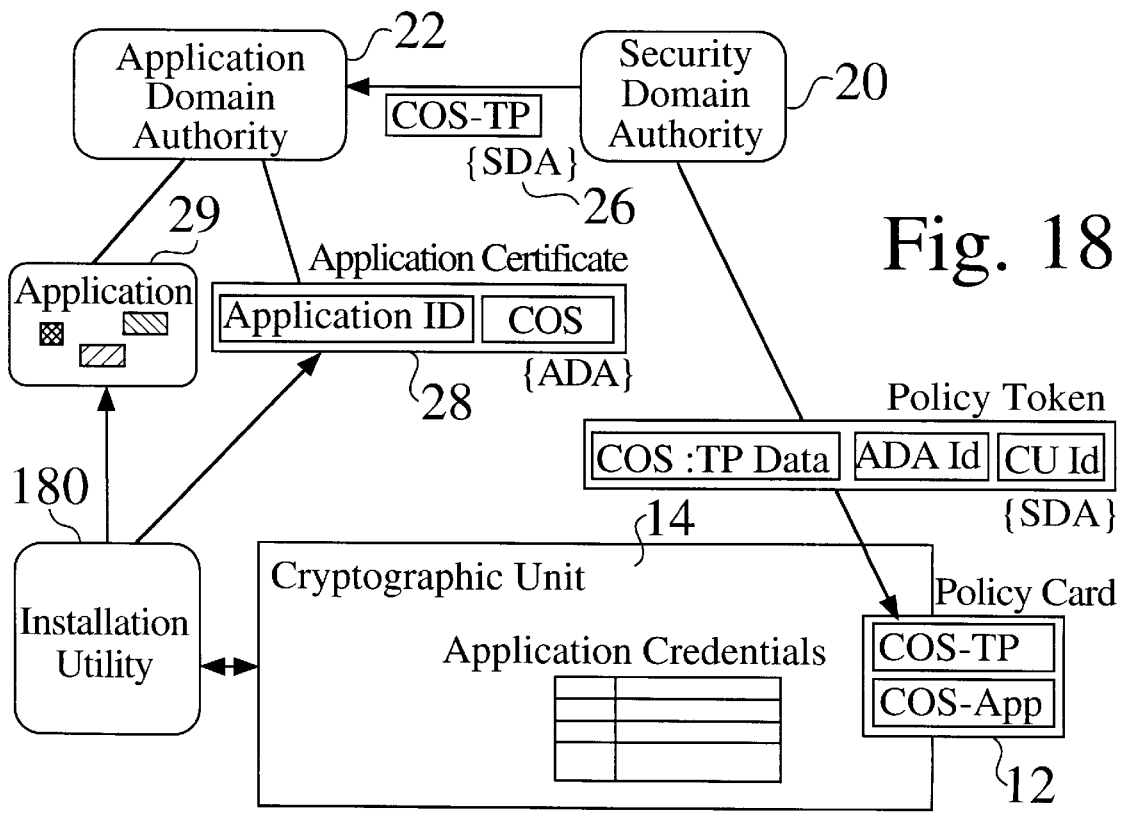
FIG. 18 is a block schematic diagram showing the installation stage according to the invention.

Installation Stage. FIG. 18 is a block schematic diagram showing the installation stage. The installation stage describes the steps taken at the target site, i.e. the host system and a specific CU 14 are necessary to prepare the application 29 for use on this system. Again, there are several objectives. The first objective is to ensure that an application is assured about the integrity of the CU. This assurance is achieved by that fact that only a CU which was granted the necessary COS to process the application image is able to successfully transform this image into a usable one. The second objective is to ensure that once an application is installed on the target system it is only usable by this system and cannot be copied to another system.

The installer component 180 is responsible for installing the application in the target system. As a part of the install process, the application's credential 28 which describes the COS 26 available to the application is created. The details of this process are described n greater detail above. The other part of the install process preforms the steps necessary to prove that this is a valid CU and to build an application image which cannot be used other than in combination with the CU that was used by the install process.

The SDA 20 grants the ADA 22 the set of COS 26. The ADA grants the application rights to a set of COS. The policy card 12 contains the valid COS for the ADA and the COS for the installer as it was granted to the ADA of the application manufacturer. The installation component car therefore only process the touchpoints in the application image if it was granted the COS to do so.

Touchpoints can in theory be removed at the installation stage. However, removing them from the application image at this stage has two consequences. First, the application has only a one time assurance that the CU is a valid CU at installation time. After the removal of touchpoints another CU could be installed along with another policy card or be bypassed when the application requests cryptographic services. Second, without the touchpoints the application is in the clear and can be copied and executed on any other system. To prevent these scenarios, the touchpoint should be removed as late as possible in the execution cycle.

Figure 19:
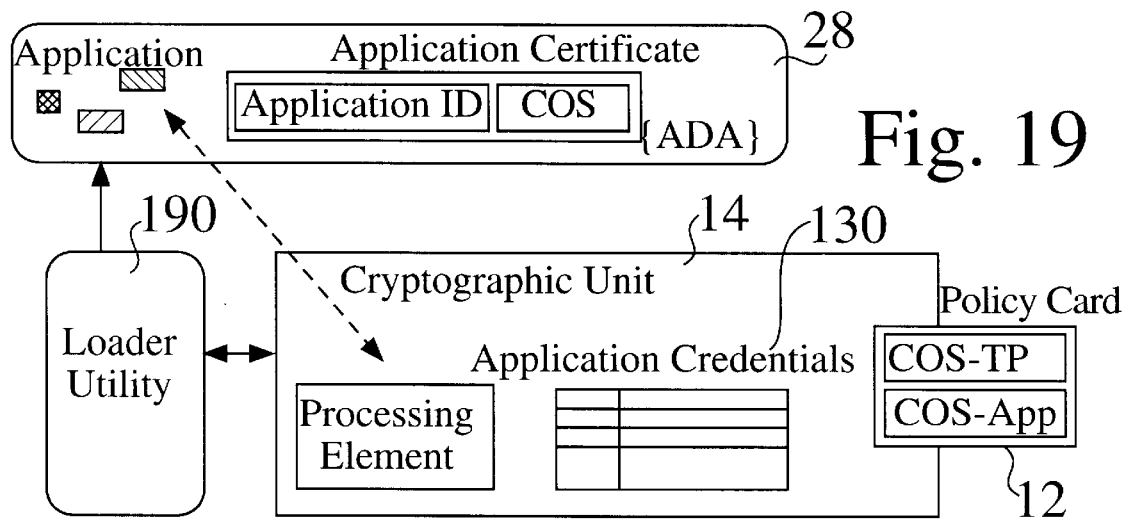
FIG. 19 is a block schematic diagram of the execution stage according to the invention.

Execution Stage. FIG. 19 is a block schematic diagram of the execution stage. In the execution stage, the application runs on the host system. The operating system loader 190 transforms the application file image into the executable memory image. One part of the process concerns the requirement of validating that the application has not been tampered with since installation time and rightfully requests a certain class of service. The steps taken to ensure this have been described above in connection with the discussion of application certification. For the CU validation portion, additional steps are required.

At application load time two main objectives need to be addressed. The first objective is to validate the CU. This task is accomplished if the CU is able to resolve the software touchpoints from the application. For, example if the CU is able to compute the original signature of the application without the touchpoints, it proved that it can successfully remove them and is therefore a valid CU because it was granted the COS to perform this operation. The second objective is to resolve the touchpoints. The CU is responsible for removing the touchpoints before the application portion that contains them is executed.

The simplest case is for the CU to remove the touchpoints from the application code image. The file image of the program would still contain the touchpoints and stays useless if copied to another system. The memory portion is however in the clear and could be copied if a malicious user would write a copy program which constructs the file image from the memory image. Such a task requires some skillset and knowledge of the underlying operating system, but is not impossible.

Another approach is to leave the touchpoints in place and resolve them as they are encountered. This approach relies on some hardware support to detect the touchpoints. This is described further in connection with the discussion on hardware support for software level touchpoints herein.

Tailoring to a unique CU. The process described so far does not establish a close relation between the software manufacturer's software component and the target system identified by the CU installed in it. The benefit of the rather loose coupling permits the manufacturer to produce an application which can be installed on any system that has the capability to process the touchpoints installed inside the application. No further knowledge about the target system is required.

If a more tight binding is desired, the application manufacturer needs to tailor the application component to the target system CU. This could be done, for example, by creating a unique COS which is shared between the manufacturer's ADA and the SDA. The SDA installs the unique COS on the policy card when it is customized for the target system CU and shares that COS with the ADA of the application manufacturer. Only the installation utility on the target system which is granted that unique COS can successfully install the software on the target system.

Figure 20:
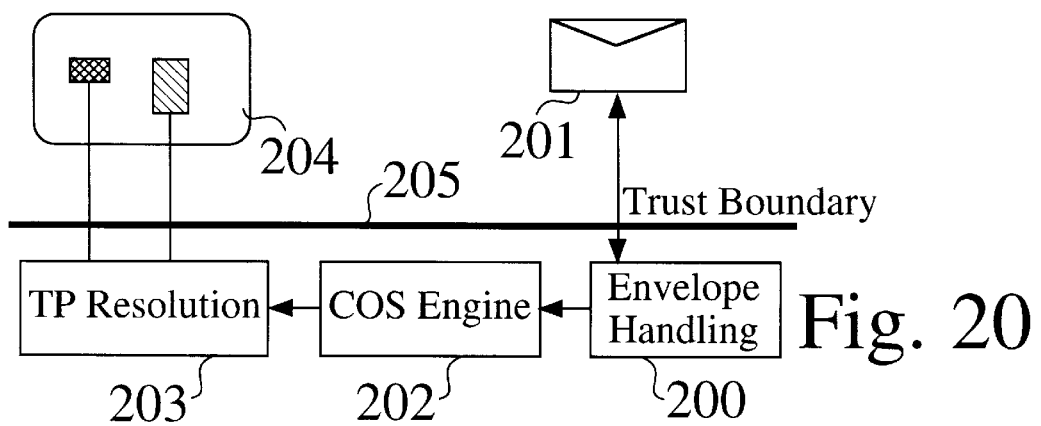
FIG. 20 illustrates the principle of Classes of Service, touchpoints, and envelopes according to the invention.

Firmware Touchpoint Support in the Cryptographic Unit. FIG. 20 illustrates the principle of Classes of Service, touchpoints, and enve opes. Firmware level touchpoints are touchpoints installed in a firmware module which resides inside the CU. As such, they must be controlled by the ICF CPU described in above. There are three basic blocks of functionality which the ICF CPU must provide to handle firmware level touchpoints.

Firmware touchpoint processing involves three basic components if the ICF CPU:

The first block is envelope handling 200. Policy activation, i.e. the process of sending the appropriate information to the CU to activate a certain class of service, is communicated between the NSS and the ICF CPU via envelopes 201 as they are described in the ICF architecture. Before any further processing of these envelopes takes place, their origin and validity needs; to be verified.

The validated and authenticated content of the envelcpe is passed on to the second component which is the COS engine 202. The COS engine can be seen as the heart of managing the classes of service installed on this CU. Each request for a service associated with a COS is directed to this engine and evaluated for access control to this resource.

In addition, the COS engine also maintains a heartbeat function which allows implementation of COS decay. Periodically, the COS engine analyzes each COS stored and verifies that the boundary conditions for this COS are still true. The boundary conditions are also evaluated for each request if the COS attribute specifies it. For example, a COS which specifies that only a certain number of operations are allowed invokes the engine evaluation mechanism on each request and decrement a counter.

The third basic component is TP Resolution 203. The TP resolution block is responsible for handling the resolution of touchpoints 204 as they are encountered by the executing firmware. Through one of the mechanisms outlined earlier, control of execution transfers to this component arid the instructions which are masked by the touchpoint are executed within the trust boundary 205 established by the ICF CPU. Once the COS engine determines that a COS is no longer accessible, the COS is marked invalid and the TP resolution process does not function for this COS. As a result, the firmware can no longer be used.

Figure 21:
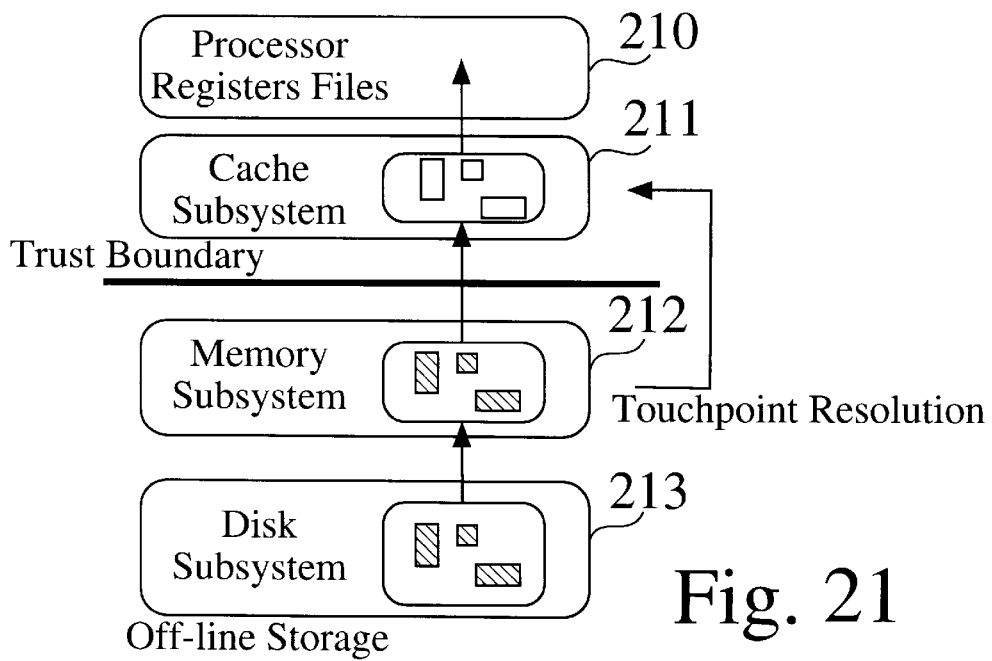
FIG. 21 illustrates the memory hierarchy with respect to the software touchpoint resolution according to the invention.

Host System Hardware Support for SW Touchpoints. FIG. 21 illustrates the memory hierarchy with respect to the software touchpoint resolution. Software level touchpoints can take advantage of hardware support from the host system CPU. A key aspect of this embodiment of the invention brings the resolution process of touchpoints closer to the host system processor execution elements. By moving the resolution process close to the processor 210, e.g. the cache subsystem 211, no touchpoint areas in the clear are in the main memory system 212 or storage elements 213 at a lower level in the memory hierarchy.

In this embodiment of the invention, there are two main approaches for resolving software level touchpoints. In the first approach, the host processor generates an exception upon detection of a software touchpoint which invokes the CU to resolve the software touchpoint. The second approach is fairly similar, except that is uses the host system processing elements for the actual operations. Both approaches can further be subdivided according to structured versus unstructured software touchpoint.

Figure 22:
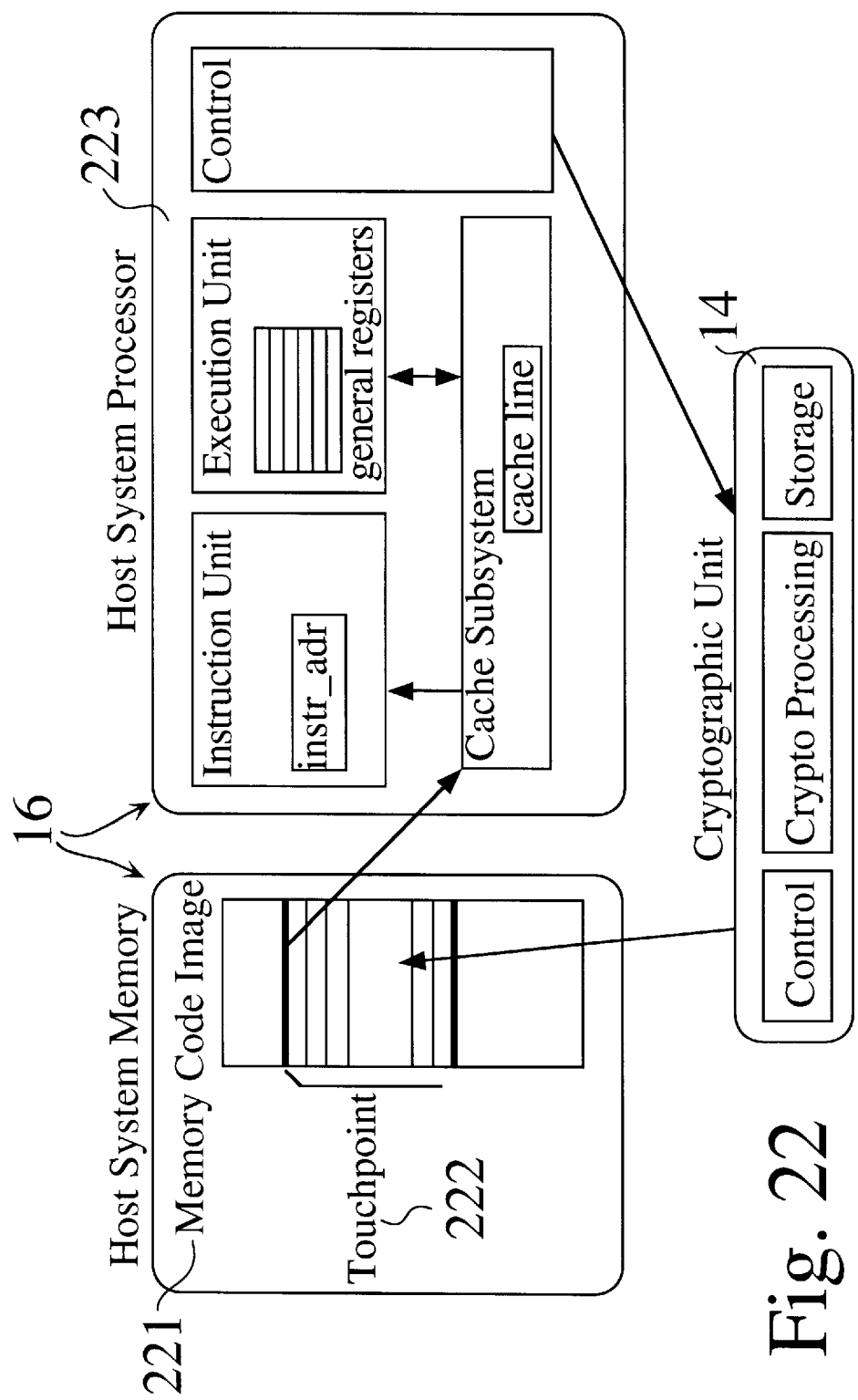
FIG. 22 shows a host system processor fetching instructions from the memory code image of an application which has structured instruction level touchpoints installed according to the invention.

The Trap to CU Approach for structured Instruction Level Touchpoints. FIG. 22 shows a host system processor fetching instructions from the memory code image 221 of an application which has structured instruction level touchpoints 222 installed. In the trap to CU approach, the host system processor 223 raises an exception when encountering a touchpoint start instruction. The exception handler invokes the CU component to remove the touchpoint and replace the touchpoint data with executable instructions. The host system processor then continues to execute the application. Upon detecting the touchpoint end instruction, the host system processor traps again and the CU can transform the memory image back to the touchpoint state.

The host system processor uses the tp_start instruction to raise an exception which cause the CU to be invoked. The CU is then given the knowledge of the memory address range and the memory location of the touchpoint to transform the touchpoint body into an instruction sequence which can be executed by the host system processor. Control then returns back to the host system processor. Once the touchpoint is translated in this fashion, other application instances could potentially access the touchpoint area. It is therefore important to implement the touchpoints as a critical section in which no application context switching is allowed. Upon end of the touchpoint instruction sequence, the tp_end instruction causes a trap to the CU which allows the CU to reverse the touchpoint data back to its original state.

Figure 23:
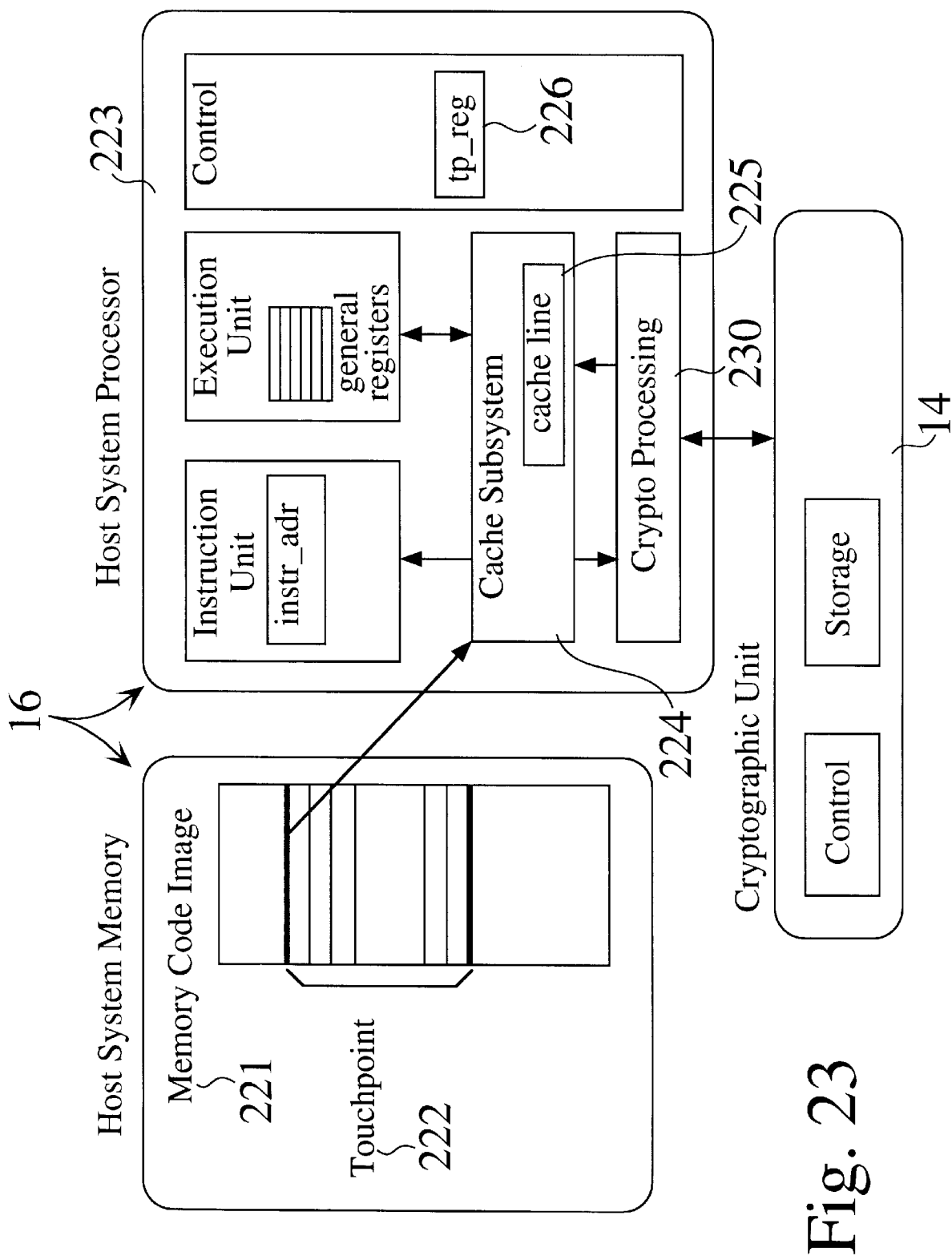
FIG. 23 is a block schematic diagram that illustrate instruction level touchpoint support inside the host system processor according to the invention.

Use of Host System Processor Elements for structured Instruction Level Touchpoints. FIG. 23 is a block schematic diagram that illustrate instruction level touchpoint support inside the host system processor. This second approach assumes that the host system processor 223 has a built in logic component 230 which allows it to the decode the touchpoint during instruction fetch. Upon encountering a touchpoint start instruction, the host system processor translates the touchpoint data within the processor's cache 224 and continues the execution. No memory image changes take place. Upon encountering the touchpoint end instruction, the cache line 225 is flushed or left for future use. To support this scheme, touchpoints are required to align on a cache boundary which should be a multiple of the cache line size.

Upon detecting a tp_start instruction by the host system processor instruction fetch unit, the host system first fetches and then transforms one or more cache lines that contain the touchpoint area, using the key stored in a host system processor control register 226. Each application may have a different tp_reg value for resolving the touchpoint area. The tp_reg value is part of the COS-TP which was used to install the application in the host system. The loading of the tp_reg control register at context switch involves the CU as the keeper of the information. The key_reg value could also be made part of the application context state, so that it can be loaded during a context switch without invoking the CU.

Approaches for unstructured Instruction Level Touchpoints and Data Level Touchpoints. Both unstructured instruction level touchpoints and data level touchpoints are characterized by the absence of any meta information about the touchpoints at the touchpoint location itself. The approach for this class of software touchpoints can be subdivided into two steps. The first step concerns the detection of these touchpoints, the second step resolves them before the host system processor accesses that area.

To detect a touchpoint area, mechanisms must be put into place in both the software environment and the hardware to propagate the information about the location of the touchpoints to the host system processing elements. For example, if the granularity of the touchpoint areas is chosen to be on a page size of the virtual memory system of the host system, the information about the touchpoint location could be communicated through the page tables and translation look aside buffers to the host system processor.

During address translation, the host processor can detect whether the address range to be translated contains software touchpoints or not. When loading the cache line for execution or access from a touchpoint page by the host system processor, the touchpoint area is resolved in the cache subsystem as described above. Similar techniques apply when the resolved touchpoint areas are kept in the cache lines and are not accessible in main memory, or the disc images of the objects that contain them. Read only cache lines are simply flushed whenever they are not needed anymore. Cache lines modified must be transformed back before they are written back to the main memory system.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for validating that an application rightfully executes a certain class of service, comprising the steps of:
    either defining classes of service with an application domain authority or creating classes of service with a security domain authority;
    wherein said classes of service are validated by said security domain authority which has policies defined to meet said security domain authorities' security interests and requirements, where said class of service has a unique identification that is not reused by said security domain authority;
    granting said level of authority from said application domain authority in the form of a certificate containing valid classes of services; and
    tightly binding said application to said certificate.

2. The method of claim 1, further comprising the step of:
    establishing trust between said application and a cryptographic unit, wherein said application is assured that said cryptographic unit has not been tampered with.

3. The method of claim 1, further comprising the steps of:
    performing application validation with a trusted load subsystem;
    loading a program image into a system memory space; and while doing that,
    validating that said application has not been tampered with.

4. The method of claim 3, wherein said application validation step further comprises the step of:
    using a checksum over a program image;
    wherein the load fails and said program image is not loaded if the checksum does not match a checksum stored by a loader subsystem at application installation time.

5. The method of claim 1, further comprising the step of:
    validating any object governed by a certificate.

6. The method of claim 2, further comprising the step of:
    challenging said cryptographic unit.

7. The method of claim 2, further comprising the steps of:
    shipping said application to a target system in a scrambled form; and
    preparing said application to function with said cryptographic unit;
    wherein only a cryptographic unit which has a correct decryption key can unscramble said application.

8. The method of claim 1, where said class of service has a unique identification that is not reused by said security domain authority.

9. The method of claim 1, further comprising the step of:
    providing a class of service from said security domain authority to said application domain authority to allow said application domain authority to issue application certificates for an application which contains said class of service;
    wherein a path of access control is formed.

10. The method of claim 1, wherein an application must have a certificate to access a method identified by said class of service.

11. The method of claim 2, further comprising the step of:
    propagating a class of service to said cryptographic unit to enable said class of service at a target cryptographic unit;
    wherein methods labelled by said class of service must be in a present state for a request to be executed.

12. The method of claim 1, wherein both control of access and control of existence of a method must always be present to maintain a method defined by said application in a functioning state.

13. The method of claim 2, further comprising the step of:
    activating said cryptographic unit with a policy before an application can be granted a class of service via said application certificate.

14. The method of claim 13, wherein said cryptographic unit must be in communication with a policy for said class of service to be downloaded.

15. The method of claim 14, wherein said policy is a virtual policy that requires a network connection to a network security server to distribute said virtual policy to said cryptographic unit.

16. The method of claim 14, wherein said policy is a physical policy that requires said cryptographic unit to implement touchpoints in hardware;
    wherein said touchpoints are placed in deterministic locations in said hardware; and
    wherein a policy containing touchpoint data can be loaded, but cannot be removed from said cryptographic unit without a decay of said application's function.

17. The method of claim 16, wherein said class of service contains the touchpoint data necessary to control said touchpoints inside said cryptographic unit.

18. The method of claim 1, wherein said class of service contains a method field that describes an actual method for which said class of service stands.

19. The method of claim 1, wherein said class of service contains a constraints field that describes attributes of said method.

20. The method of claim 1, wherein the interval for which a class of service can be declared to be valid may be unbounded or may be considered by a predetermined criteria.

21. The method of claim 1, wherein classes of service are organized not only by an object that they describe, but also by a level of validation or set of constraints an implementation performs before granting a service level described by said class of service.

22. The method of claim 20, said class of service further comprising:

a special, predefined class of service that is used to guard class of service decay functionality.

23. The method of claim 22, wherein tighter validation and control over a service to be granted is achieved based upon said level of validation or set of constraints.

24. The method of claim 23, further comprising the step of:

providing a class of service level that validates a class of service ID, as it is made available through an application certificate, has been signed by a security domain authority.

25. The method of claim 24, further comprising the step of:

providing a class of service level that requires validation of said application certificate, where said certificate is required to be issued by said application domain authority that requested the class of service identified by said class of service ID from said security domain authority.

26. The method of claim 25, further comprising the step of:

providing a class of service level that requires validation of said application ID issued by said application domain authority.

27. The method of claim 26, further comprising the step of:

providing a class of service level that requires interaction with a network security server to validate said class of service requested by said application.

28. The method of claim 27, further comprising the step of:

providing a class of service level that interacts with said network security server on each operation requested by said application.

29. The method of claim 28, further comprising the step of:

providing a class of service level that requires a token for anyone, or combination of, validations and interactions.

30. The method of claim 29, wherein said class of service levels may be provided alone or in combination.

31. An apparatus for validating that an application rightfully executes a certain class of service, comprising:

an application domain authority for granting a level of authority in the form of a certificate containing valid classes of service;

means for either creating classes of service with a security domain authority or for defining classes of service with said application domain authority, where said classes of service are validated by said security domain authority which has policies defined to meet said security domain authorities' security interests and requirements, where said class of service has a unique identification that is not reused by said security domain authority; and means for tightly binding said application to said certificate.

32. The apparatus of claim 31, further comprising:

a cryptographic unit; and means for establishing trust between said application and said cryptographic unit, wherein said application is assured that said cryptographic unit has not been tampered with.

33. The apparatus of claim 31, further comprising:

a trusted load subsystem for performing application validation;

means for loading a program image into a system memory space; and while doing that, validating that said application has not been tampered with.

34. The apparatus of claim 33, wherein said trusted load subsystem further comprises:

means for using a checksum over a program image;

wherein the load fails and said program image is not loaded if the checksum does not match a checksum stored by a loader subsystem at application installation time.

35. The apparatus of claim 31, further comprising:

means for validating any object governed by a certificate.

36. The apparatus of claim 31, further comprising:

means for challenging said cryptographic unit.

37. The apparatus of claim 32, wherein said application is shipped to a target system in a scrambled form;

said apparatus further comprising:

means for preparing said application to function with said cryptographic unit;

wherein only a cryptographic unit which has a correct decryption key can unscramble said application.

38. The apparatus of claim 31, where said class of service has a unique identification that is not reused by said security domain authority.

39. The apparatus of claim 31, further comprising:

means for providing a class of service from said security domain authority to said application domain authority to allow said application domain authority to issue application certificates for an application which contains said class of service;

wherein a path of access control is formed.

40. The apparatus of claim 31, wherein an application must have a certificate to access a method identified by said class of service.

41. The apparatus of claim 32, further comprising:

means for propagating a class of service to said cryptographic unit to enable said class of service at a target cryptographic unit;

wherein methods labelled by said class of service must be in a present state for a request to be executed.

42. The apparatus of claim 31, wherein both control of access and control of existence of a method must always be present to maintain a method defined by said application in a functioning state.

43. The apparatus of claim 32, further comprising:

a policy for activating said cryptographic unit before an application can be granted a class of service via said application certificate.

44. The apparatus of claim 43, wherein said cryptographic unit must be in communication with a policy for said class of service to be downloaded.

45. The apparatus of claim 39, wherein said policy is a virtual policy that requires a network connection to a network security server to distribute said virtual policy to said cryptographic unit.

46. The apparatus of claim 39, wherein said policy is a physical policy that requires said cryptographic unit to implement touchpoints in hardware;

wherein said touchpoints are placed in deterministic locations in said hardware; and wherein a policy containing touchpoint data can be loaded, but cannot be removed from said cryptographic unit without a decay of said application's function.

47. The apparatus of claim 46, wherein said class of service contains the touchpoint data necessary to control said touchpoints inside said cryptographic unit.

48. The apparatus of claim 31, wherein said class of service contains a method field that describes an actual method for which said class of service stands.

49. The apparatus of claim 31, wherein said class of service contains a constraints field that describes attributes of said method.

50. The apparatus of claim 31, wherein the interval for which a class of service can be declared to be valid may be an unbounded or may be constrained by predetermined criteria.

51. The apparatus of claim 50, said class of service furtier comprising:

a special, predefined class of service that is used to guard class of service decay functionality.

52. The apparatus of claim 31, wherein classes of service are organized not only by an object that they describe, but also by a level of validation or set of constraints an implementation performs before granting a service level described by said class of service.

53. The apparatus of claim 52, wherein tighter validation and control over a service to be granted is achieved based upon said level of validation or set of constraints.

54. The apparatus of claim 52, further comprising:

a class of service level that validates a class of service ID, as it is made available through an application certificate, has been signed by a security domain authority.

55. The apparatus of claim 54, further comprising:

a class of service level that requires validation of said application certificate, where said certificate is required to be issued by said application domain authority that requested the class of service identified by said class of service ID from said security domain authority.

56. The apparatus of claim 55, further comprising:

a class of service level that requires validation of said application ID issued by said application domain authority.

57. The apparatus of claim 56, further comprising:

a class of service level that requires interaction with a national security server to validate said class of service requested by said application.

58. The apparatus of claim 57, further comprising:

a class of service level that interacts with said national security server on each operation requested by said application.

59. The apparatus of claim 58, further comprising:

a class of service level that requires a token for any one, or combination of, validations and interactions.

60. The apparatus of claim 59, wherein said class of service levels may be provided alone or in combination.

* * * * *

UNITED STATES PATENT AND TRADEMARK OFFICE
CERTIFICATE OF CORRECTION

PATENT NO. : 5,841,870
DATED : November 24, 1998
INVENTOR(S) : Fieres et al.

It is certified that error appears in the above-identified patent and that said Letters Patent is hereby corrected as shown below:

<u>Title page,</u>
Item [73], should read -- Hewlett-Packard Company --

<u>Column 4,</u>
Lines 15-16, delete "DETRILED DESCRIPTION OF THE INUENTION" and insert therefor -- DETAILED DESCRIPTION OF THE INVENTION --

<u>Column 19,</u>
Line 13, after "point" insert -- . --

<u>Column 29,</u>
Line 11, delete "furtier" and insert therefor -- further --

Signed and Sealed this

Twenty-sixth Day of November, 2002

Attest:

Attesting Officer

JAMES E. ROGAN
Director of the United States Patent and Trademark Office